United States Patent
Rudolf et al.

(10) Patent No.: US 9,762,356 B2
(45) Date of Patent: Sep. 12, 2017

(54) SYSTEMS AND METHODS FOR IMPROVED UPLINK COVERAGE

(71) Applicant: INTERDIGITAL PATENT HOLDINGS, INC., Wilmington (DE)

(72) Inventors: Marian Rudolf, Montreal (CA); Paul Marinier, Brossard (CA); Diana Pani, Montreal (CA); Ghyslain Pelletier, Laval (CA); Christopher Cave, Dollard-des-Ormeaux (CA); Lakshmi R. Iyer, King of Prussia, PA (US); Muhammad U. Fazili, Audubon, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/374,504

(22) PCT Filed: Jan. 24, 2013

(86) PCT No.: PCT/US2013/022916
§ 371 (c)(1),
(2) Date: Jul. 24, 2014

(87) PCT Pub. No.: WO2013/112703
PCT Pub. Date: Aug. 1, 2013

(65) Prior Publication Data
US 2014/0362832 A1    Dec. 11, 2014

Related U.S. Application Data

(60) Provisional application No. 61/590,292, filed on Jan. 24, 2012, provisional application No. 61/611,799, (Continued)

(51) Int. Cl.
*H04L 1/16* (2006.01)
*H04L 1/18* (2006.01)
*H04W 72/04* (2009.01)

(52) U.S. Cl.
CPC .......... *H04L 1/1678* (2013.01); *H04L 1/1822* (2013.01); *H04L 1/1887* (2013.01); *H04W 72/0413* (2013.01); *H04W 72/0446* (2013.01)

(58) Field of Classification Search
CPC ... H04L 1/1887; H04L 1/1882; H04L 1/1678; H04L 1/1822; H04W 72/0446; H04W 72/0413
(Continued)

(56) References Cited

U.S. PATENT DOCUMENTS

| 6,006,106 A | 12/1999 | Cook et al. |
| 7,764,661 B2 * | 7/2010 | Heo ....................... H04L 1/0007 370/235 |

(Continued)

FOREIGN PATENT DOCUMENTS

| CN | 101562838 A | 10/2009 |
| CN | 101682488 A | 3/2010 |

(Continued)

OTHER PUBLICATIONS

3rd Generation Partnership Project (3GPP), Tdoc R2-072630, "HARQ operation in case of UL Power Limitation", Ericsson, 3GPP TSG-RAN WG2, Meeting #58bis, Orlando, USA Jun. 25-29, 2007, 4 pages.

(Continued)

*Primary Examiner* — Luat Phung
*Assistant Examiner* — Thomas R Cairns
(74) *Attorney, Agent, or Firm* — Condo Roccia Koptiw LLP

(57) ABSTRACT

Systems and method are specified to improve the reception of UL transmission, for example in power or coverage
(Continued)

limited situations. A WTRU may modify procedures to increase the available signal energy for reception at an eNB and/or to make more efficient use of the available signal energy at the receiver for processing UL transmissions. Example methods for increasing UL link coverage may include modifying HARQ timing (e.g., shorter HARQ), using longer TTIs, use of dedicated PUSCH allocations, use of new PUSCH modulations, enhanced reference signal design, UL macro diversity reception for PUSCH, utilizing protocol reduction techniques, ensuring in-order packet delivery, and/or utilizing a configuration for coverage limited/power limited modes of operation. The proposed methods may be applied individually or in any combination.

13 Claims, 10 Drawing Sheets

Related U.S. Application Data filed on Mar. 16, 2012, provisional application No. 61/611,972, filed on Mar. 16, 2012.

(58) Field of Classification Search
USPC .......................................... 370/329, 336, 437
See application file for complete search history.

(56) References Cited

U.S. PATENT DOCUMENTS

| | | | |
|---|---|---|---|
| 8,281,202 B2 | 10/2012 | Tseng | |
| 8,296,616 B2* | 10/2012 | Wu | H04L 1/189 714/748 |
| 8,370,696 B2* | 2/2013 | Sagfors | H04L 1/1819 714/748 |
| 8,780,826 B2* | 7/2014 | Xu | H04L 5/00 370/329 |
| 2009/0259911 A1* | 10/2009 | Tseng | H04L 1/1812 714/748 |
| 2009/0268707 A1 | 10/2009 | Pani et al. | |
| 2009/0307554 A1* | 12/2009 | Marinier | H04L 1/1812 714/748 |
| 2009/0307556 A1* | 12/2009 | Cai | H04W 72/044 714/748 |
| 2010/0008348 A1* | 1/2010 | Zhang | H04L 1/1887 370/345 |
| 2010/0111068 A1* | 5/2010 | Wu | H04L 1/1812 370/345 |
| 2010/0128687 A1* | 5/2010 | Oteri | H04L 1/1887 370/329 |
| 2010/0192035 A1 | 7/2010 | Sagfors et al. | |
| 2011/0038352 A1* | 2/2011 | Bergman | H04L 1/1812 370/331 |
| 2011/0051840 A1* | 3/2011 | Hooki | H04L 1/08 375/295 |
| 2012/0064846 A1 | 3/2012 | Yokomakura et al. | |
| 2012/0236718 A1* | 9/2012 | Noureddin | H04L 47/12 370/235 |
| 2013/0272281 A1* | 10/2013 | Xu | H04L 1/1812 370/336 |
| 2015/0163020 A1 | 6/2015 | Sagfors et al. | |

FOREIGN PATENT DOCUMENTS

| | | |
|---|---|---|
| EP | 2106056 A1 | 9/2009 |
| WO | WO 2008/156414 A2 | 12/2008 |
| WO | WO 2009/131509 A1 | 10/2009 |
| WO | WO 2009/157729 A2 | 12/2009 |

OTHER PUBLICATIONS

3$^{rd}$ Generation Partnership Project (3GPP), R1-120008, "Email Discussion Summary on Coverage Issues Identification", China Telecom (Rapporteur), 3GPP TSG RAN WG1, Meeting #68, Dresden, Germany, Feb. 6-10, 2012, 2 pages.

3$^{rd}$ Generation Partnership Project (3GPP), R1-121129, "Evaluation of TTI bundling enhancement for medium rate PUSCH", China Telecom, TSG-RAN WG1, Meeting # 68bis, Jeju, Korea, Mar. 26-30, 2012, 3 pages.

3$^{rd}$ Generation Partnership Project (3GPP), TS 36.213 V10.4.0, "3$^{rd}$ Generation Partnership Project; Technical Specification Group Radio Access Network; Evolved Universal Terrestrial Radio Access (E-UTRA); Physical layer procedures (Release 10)", Dec. 2011, 125 pages.

3$^{rd}$ Generation Partnership Project (3GPP), TS 36.321 V10.4.0, "3$^{rd}$ Generation Partnership Project; Technical Specification Group Radio Access Network; Evolved Universal Terrestrial Radio Access (E-UTRA); Medium Access Control (MAC) protocol specification (Release 10)", Dec. 2011, 54 pages.

3$^{rd}$ Generation Partnership Project (3GPP), TW 36.331 V10.4.0, "3$^{rd}$ Generation Partnership Project; Technical Specification Group Radio Access Network; Evolved Universal Terrestrial Radio Access (E-UTRA); Radio Resource Control (RRC); Protocol specification (Release 10)", Dec. 2011, 296 pages.

Susitaival et al, "LTE coverage improvement by TTI bundling", Apr. 2009, 5 pages.

Zhou et al, "LTE Uplink Coverage Enhancement Techniques Based on Enhanced TTI Bundling", Sep. 2012, 4 pages.

Holma, Harri, and Antti Toskala, eds. *LTE for UMTS: OFDMA and SC-FDMA Based Radio Access.* Chichester, U.K.: Wiley, 2009., sections of relevance 10.8, 12.3.4, and 12.6.3.5, 5 pages.

\* cited by examiner

SYSTEMS AND METHODS FOR IMPROVED UPLINK COVERAGE

CROSS REFERENCE TO RELATED APPLICATIONS

This application is the National Stage Entry under 35 U.S.C. 371 of Patent Cooperation Treaty Application No. PCT/US2013/022916, filed Jan. 24, 2013, which claims the benefit of U.S. Provisional Patent Application No. 61/590, 292 filed Jan. 24, 2012, U.S. Provisional Patent Application No. 61/611,799 filed Mar. 16, 2012, and U.S. Provisional Patent Application No. 61/611,972 filed Mar. 16, 2012, the contents of which are hereby incorporated by reference in their entirety.

BACKGROUND

Link performance and coverage of Long Term Evolution (LTE) Release 10 downlink (DL) and/or uplink (UL) control and data channels for noise-limited scenarios have been addressed on numerous fronts using various methods, scenarios, and/or techniques. For example, the UL voice over internet protocol (VoIP) link performance when using LTE radio technology may be compared to existing 3G High Speed Packet Access (HSPA) radio technology. In order to match link coverage performance of the 3G HSPA UL, LTE protocols may be modified in order to increase coverage. For example, in order to improve LTE UL coverage achievable for VoIP, an increase of 3-4 dB may result in coverage numbers similar to those achievable with the 3G HSPA UL. The performance numbers obtained for existing LTE radio access may already include the possibility to use transmission time interval (TTI) bundling mode size 4 and/or radio link control (RLC) segmentation. Unfortunately, current methods, scenarios, and/or techniques may not fully increase LTE link performance and coverage, and, in particular, may provide an opportunity for improving the reception or coverage of UL transmissions.

SUMMARY

Method and systems are disclosed for increasing WTRU UL coverage. The method and systems described herein may facilitate an increase in available signal energy received by an evolved Node B (eNB) to be used for UL transmission decoding, thereby increasing the probability of a successful decoding. The systems and methods described herein may facilitate the more efficient use of UL resources available for transmission.

For example, a method implemented in a WTRU for improving UL resource utilization may include determining to implement one or more procedures associated with coverage limited operation. The method may include setting one or more UL transmission parameters to implement the one or more procedures associated with coverage limited operation. For example, setting the one or more UL transmission parameters to implement the one or more procedures associated with coverage limited operation may include one or more of implementing UL hybrid automatic repeat request (HARQ) operation with a maximum round trip time (RTT) of less than eight subframes, dynamically modifying one or more HARQ/Transmission Time Interval (TTI) Bundling parameters during UL operation, utilizing a dedicated allocation of a physical uplink shared channel (PUSCH), performing a PUSCH transmission to multiple radio access network (RAN) reception points, or transmitting one or more radio link control (RLC) protocol data units (PDUs) without an RLC sequence number.

In an example, implementing UL HARQ operation with the maximum RTT of less than eight subframes may include transmitting a HARQ transmission less than four subframes after receiving a UL grant. Implementing UL HARQ operation with the maximum RTT of less than eight subframes may include receiving HARQ feedback for the HARQ transmission less than four subframes after transmitting the HARQ transmission. In an example, a first HARQ process of a HARQ entity may be associated with a first maximum RTT and a second HARQ process of the HARQ entity may be associated with a second maximum RTT.

In an example, dynamically modifying the one or more HARQ/TTI Bundling parameters during UL operation may include modifying one or more of a number of subframes between reception of a UL grant and a HARQ transmission, a number of subframes between the HARQ transmission and HARQ feedback reception, a number of subframes between the HARQ feedback and a HARQ feedback transmission, and/or a size of a TTI bundling window. Dynamically modifying the one or more HARQ/TTI Bundling parameters during UL operation may be based on receiving one or more of physical layer control signaling, a medium access control (MAC) control element (CE), and/or a radio resource control (RRC) message from an evolved Node B (eNB). Dynamically modifying the one or more HARQ/TTI Bundling parameters during UL operation may be based on one or more of an identity of a frame or subframe in which a given UL transmission is going to occur or a property of an allocation of the given UL transmission.

Setting the one or more UL transmission parameters to implement the one or more procedures associated with coverage limited operation may include utilizing a dedicated allocation of the PUSCH. A dedicated allocation of the PUSCH may allocate one or more of the same resource block(s) or the same resource elements to the WTRU for multiple subframes within a radio frame. The dedicated allocation of the PUSCH may indicate an allocation period for which the dedicated allocation is valid and a recurrence period for transmissions occurring within the allocation period.

Mo Setting the one or more UL transmission parameters to implement the one or more procedures associated with coverage limited operation may include performing a PUSCH transmission to the multiple RAN reception points. Performing the PUSCH transmission to the multiple RAN reception points may include modifying a power control procedure to take into account feedback received from a non-serving evolved Node-B (eNB) and/or a pathloss associated with transmissions to the non-serving eNB. Setting the one or more UL transmission parameters to implement the one or more procedures associated with coverage limited operation may include transmitting the one or more RLC PDUs without an RLC sequence number. When doing, the WTRU may ensure in-order delivery of the one or more RLC PDUs without an RLC sequence number to an RLC entity.

In an example, a method implemented in a WTRU for improving UL coverage using physical layer processing techniques may include determining that the WTRU should transition to a coverage limited mode. The method may include modifying UL physical layer operation to implement the coverage limited mode. Modifying the UL physical layer operation to implement the coverage limited mode may include one or more of utilizing a TTI that spans a plurality of subframes, transmitting a pilot sequence that is interleaved with PUSCH data, using both single carrier frequency division multiple access (SC-FDMA) and a modulation other than SC-FDMA to perform uplink transmissions, or changing an UL transmission scheme based on a property of a UL transmission to be performed.

In an example, modifying the UL physical layer operation to implement the coverage limited mode may include utilizing the TTI that spans a plurality of subframes. Subframes utilized for the TTI that spans a plurality of subframes may or may not be consecutive in the time domain. Utilizing the TTI that spans a plurality of subframes may include transmitting a first redundancy version of a transport block (TB) in a first TTI that spans a plurality of subframes. Utilizing the TTI that spans a plurality of subframes may further include transmitting a second redundancy version of the TB in a second TTI that spans a plurality of subframes.

Modifying the UL physical layer operation to implement the coverage limited mode may include transmitting a pilot sequence that is interleaved with PUSCH data. For example, the pilot sequence may be interleaved with PUSCH data during shift randomization. Modifying the UL physical layer operation to implement the coverage limited mode may include using both SC-FDMA and the modulation other than SC-FDMA to perform uplink transmissions. Transmissions using SC-FDMA and transmissions using the modulation other than SC-FDMA are may be multiplexed in the time domain, in the frequency domain, and/or in the time and frequency domains. Modifying the UL physical layer operation to implement the coverage limited mode may include changing the UL transmission scheme based on a property of a UL transmission to be performed. Changing the UL transmission scheme may include changing one or more of a number of pilot signals per timeslot or subframe, changing a position of pilot signals with an orthogonal frequency division multiplexing (OFDM) symbol, changing a type of modulation, and/or changing a spreading code or spreading factor.

The methods and systems described herein may be implemented in a WTRU. The WTRU may include a processor that is configured to perform the method. For example, the WTRU may be configured to improve UL resource utilization and/or to modify physical layer procedures to increase UL coverage. The WTRU may be configured to receive a configuration from an evolved eNB. The configuration may indicates parameters to be used for UL operation while the WTRU is configured to operate the coverage limited mode and/or parameters to be used for UL operation while the WTRU is not configured to operate in the coverage limited mode. The WTRU may be configured to autonomously determine whether or not to operate according to coverage limited mode, for example based on measurements performed by the WTRU. The WTRU may be configured to determine whether or not to operate according to coverage limited mode based on explicit signaling received from an eNB.

BRIEF DESCRIPTION OF THE DRAWINGS

A more detailed understanding may be had from the following description, given by way of example in conjunction with the accompanying drawings wherein:

FIG. 7 illustrates another example of possible configuration of a long TTI.

FIG. 8 illustrates an example of a long TTI that may be altered to accommodate transmission of a normal TTI.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application.

Figure 1A:
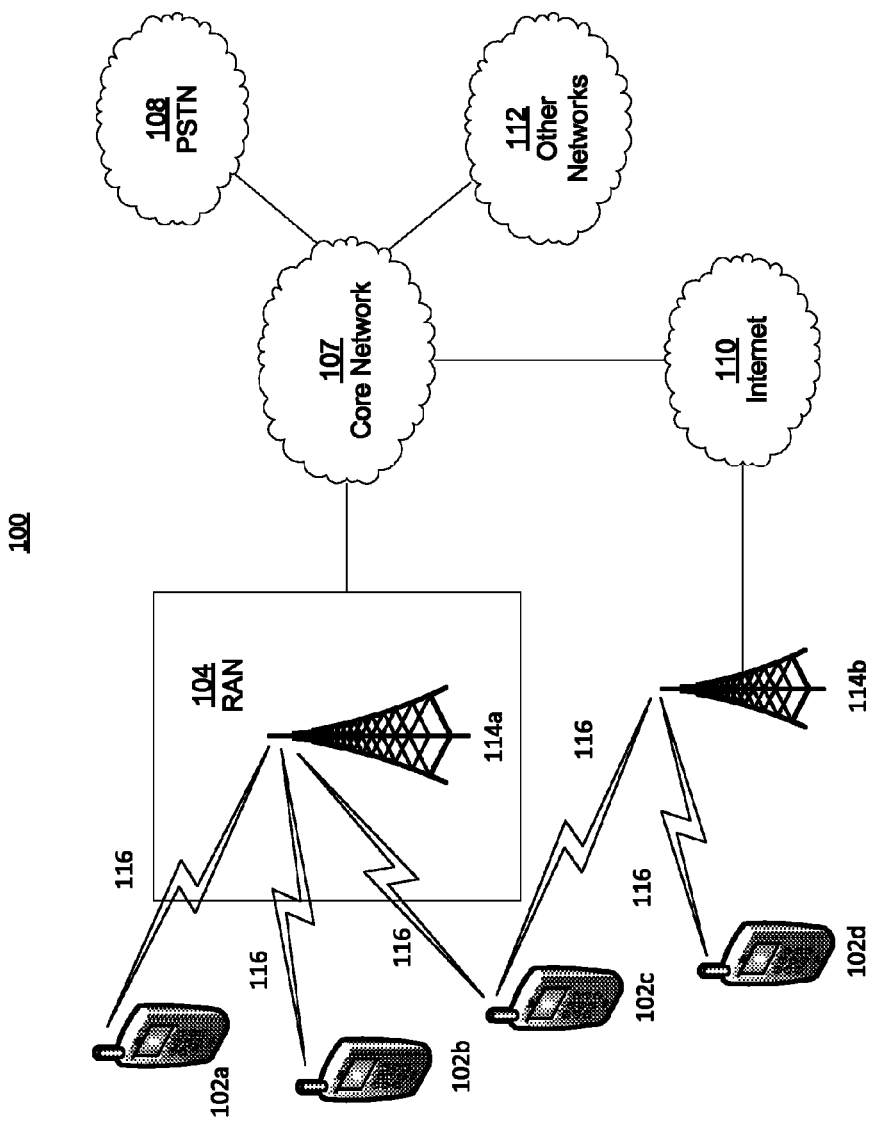
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 104, a core network 107, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 107, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 107.

The RAN 104 may be in communication with the core network 107, which may be any type of network configured to provide voice, data, applications, and/or voice over internet protocol (VoIP) services to one or more of the WTRUs 102a, 102b, 102c, 102d. For example, the core network 107 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 107 may be in direct or indirect communication with other RANs that employ the same RAT as the RAN 104 or a different RAT. For example, in addition to being connected to the RAN 104, which may be utilizing an E-UTRA radio technology, the core network 107 may also be in communication with another RAN (not shown) employing a GSM radio technology.

The core network 107 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
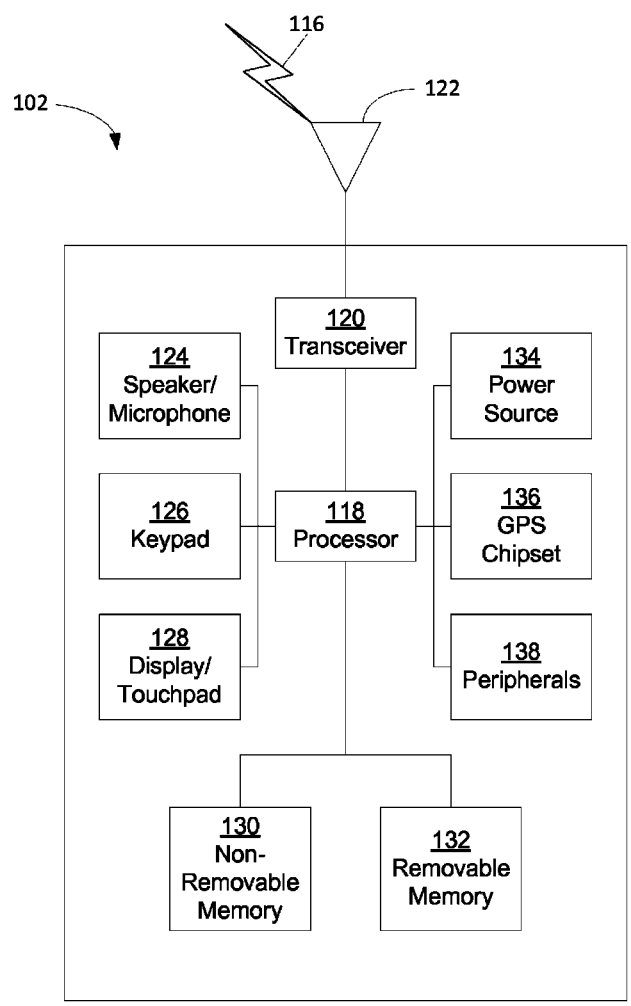
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
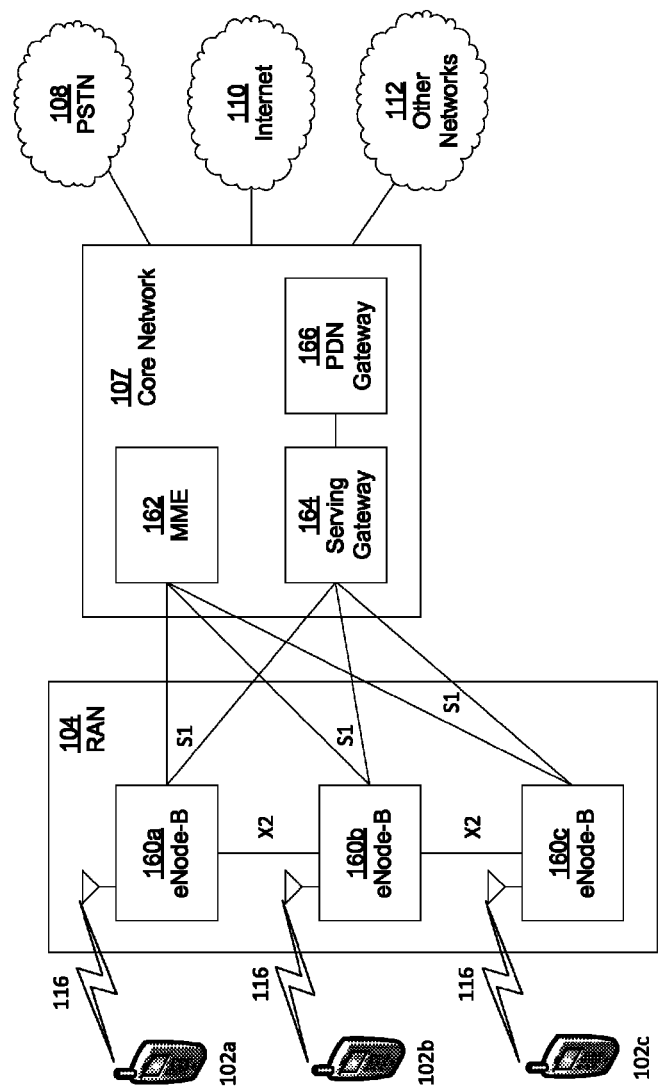
FIG. 1C is a system diagram of an example radio access network and an example core network that may be used within the communications system illustrated in FIG. 1A.

FIG. 1C is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, 160c may communicate with one another over an X2 interface.

The core network 107 shown in FIG. 1C may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Typically, a VoIP packet from the speech codec arrives for transmission about every 20 ms. Given the small payload of such speech packets (e.g., on the order of 30-40 bytes or less including protocol overhead), every such voice packet may in principle be sent as a single transport block (TB) in a single subframe. When HARQ re-transmissions and TTI bundling are not used, sending each voice packet in a single TB in a single subframe may lead to a total of 5% UL transmission activity. In other words, there would be a single VoIP packet coded in the form of a single new TB mapped to a single subframe every 20 ms.

Several techniques may be pertinent when considering the achievable coverage for LTE radio access. For example, HARQ re-transmissions, TTI bundling, RLC segmentation, IP packet bundling, modification of reference signal scheduling, and/or one-way user-plane delays may be considered when designing a coverage scheme.

If HARQ re-transmissions are utilized, the amount of utilized WTRU UL transmission time may be increased both per voice packet and/or per WTRU. For an incoming VoIP packet mapped to 1 TB, typically up to 6 HARQ retransmissions may be allowed with a 50 ms UL Uu delay budget. Therefore, a VoIP packet may be transmitted up to a total of 7 times over the duration of the same 50 ms period, assuming the Release 8/10 LTE Maximum round trip time (RTT) of 8 subframes. Given that on average 2 or 3 concurrent VoIP packets, or 2 or 3 parallel HARQ processes are being transmitted in any given frame by the WTRU, the use of HARQ retransmissions may lead to an average of 30% UL transmission activity. In other words, on average 3 out of every 10 UL subframes may be used by the WTRU for VoIP transmission. Accordingly, UL coverage for a VoIP codec packet transmission in presence of HARQ may be nominally improved by a (linear) factor of 7 as compared to no HARQ. Such an improvement in subframe utilization may correspond to about 8.4 dB more energy collected per VoIP packet by the receiver, discounting for performance aspects in presence of real-life fading channels.

Release 8 LTE introduced the TTI bundling mode of operation to improve UL coverage. TTI bundling may be configured so as to proactively re-transmit data included in a given transport block prior to receiving any feedback regarding the reception of the TB. The TBs associated with the TTI bundle may be used to transmit the same data and/or different redundancy versions of the same data. TTI bundling may be designed to maximize the amount of time a WTRU may transmit continuously with maximum power.

In an example, TTI bundling may repeat the same data in multiple TTIs. For example, LTE Release 8 may specify a TTI bundle size of 4; however, Release 8 LTE does not specify other possible bundle sizes. The achievable UL performance may be increased when employing physical uplink shared channel (PUSCH) bundle sizes of both 4 and 8. For example, a single TB may be channel coded and transmitted in a set of 4 consecutive TTIs. The bundled TTIs may be treated as a single resource, for example by utilizing a single UL grant and a single physical HARQ indicator channel (PHICH) ACK/NACK for the entire bundle. TTI bundling in Release 8/10 LTE may be activated through radio resource control (RRC) signaling. For example, a evolved Node B (eNB) may observe WTRU transmissions and determine a WTRU pathloss. If the WTRU pathloss exceeds a critical value and/or predetermined threshold, the eNB may activate TTI bundling.

If Release 8/10 HARQ is utilized but TTI bundling is not, a VoIP codec packet including its protocol overhead may typically result in up to 7 TTIs with the existing LTE n+4 HARQ timelines. When Release 8/10 TTI bundling is used, a VoIP packet may be transmitted using a bundle of 4 consecutive subframes. A TTI bundling pattern may repeat in periods of 16 subframes. For example, for the same 50 ms UL Uu delay budget, 12 subframes (or 3 patterns that are each 16 subframes long and contain 4 TTIs) may be received by the receiver. Therefore, TTI bundling may result in a coverage boost of approximately 2.3 dB (e.g., 10*log 10(12/7)) due to an increase in the collection of energy by the decoder. Second order impacts such as burst error rates (e.g., the probability of the entire bundle in four consecutive TTIs being lost versus probability of a single TTI being lost) may be considered when designing a system with increased coverage. For example, transmission errors may often occur in bursts, so increasing the bundle size from 4 to 8 while still keeping the pattern to 16 subframes may result in an additional 1 dB improvement, but perhaps not much more than that if errors occur in bursts.

The Release 8/10 LTE RLC protocol may perform segmentation and/or concatenation of higher layer PDUs. One approach to improve LTE UL coverage may be to segment RLC SDUs (e.g., VoIP codec packets including compressed IP and above headers) into several smaller units. For example, a stronger modulation and coding scheme (MCS) may be selected when channel coding each of the TBs that corresponds to the smaller/segmented PDUs. By doing so, it may be more likely that the resulting smaller TBs will be decoded correctly. Given that the resulting number of concurrently used running HARQ processes may increase when compared to the case where RLC segmentation is not utilized, the effective UL subframe utilization and/or UL transmission activity may be increased.

The performance and drawbacks when segmenting VoIP codec packets (e.g., RLC PDUs/SDUs) into smaller RLC PDUs/SDUs to improve UL coverage may be compared. The resulting overhead from creating smaller RLC PDUs may begin to significantly impact the achievable gains in terms of the observable Eb/No improvement when the number of RLC segments per SDU is increased beyond 4. Another aspect to consider may be the reduction of the number of available retransmissions per HARQ process on a per PDU basis. A new SDU is typically transmitted every 20 ms. This may result in N segmented PDUs occupying N HARQ processes starting every 20 ms. Each of these HARQ processes may remain active during the allowed 50 ms one-way Uu delay budget. In Release 8/10 LTE, since a single HARQ process per subframe or a single TB transmission per subframe may be present, when subsequent SDUs arrive for transmission, UL subframe utilization may become a limiting factor because the previous HARQ processes may still be transmitting retransmissions. Using RLC segmentation, there may be a trade-off between the number of HARQ retransmissions per RLC PDU and the number of concurrent HARQ processes. Note that when RLC segmentation is used together with TTI bundling, typically no more than two RLC PDUs per SDU may be accommodated, typically resulting in four or less active HARQ processes when TTI bundling is used.

For example, DL IP packet bundling may be a technique that is designed to trade-off single user transmission efficiency against system capacity in LTE systems. IP packet bundling may be the operation of bundling multiple VoIP packets together for 1 single transmission in a subframe. Such VoIP packet bundling may be channel quality indicator (CQI) based. For example, VoIP packet bundling may be applied to users which are deemed by the eNB to be in favorable channel conditions. Because bundled VoIP packets may be subject to tighter allowed one-way Uu delay budgets, on average fewer HARQ retransmissions may be used. There may be an achievable DL performance increase when aggregating 2 VoIP packets at the codec (e.g., IP or above) layer into a single TB. For example, the increased TB sizes when aggregating 2 IP packets may not result in a significant coverage loss. However, the lack of coverage loss may be attributed to the much higher available eNB Tx power for the DL. Because of UL Tx power limitations and the principle of non-CQI based UL scheduling in LTE, IP packet bundling may not be as effective of a technique for UL coverage improvements as for DL coverage improvement.

Existing Release 8/9/10 transmission schemes for the Physical Uplink Control Channel (PUCCH) and the Physical Uplink Shared Channel (PUSCH) may offer limited flexibility in terms of the configuring which resources (e.g., resource elements) include user and/or control data versus which resources include pilot signals. For example, the PUSCH may include one pilot symbol at the center of each timeslot while other transmission schemes, such as PUCCH Format 3, may include two pilot symbols per timeslot. For instance, PUCCH Format 3 may include a pilot signal on symbols #2 and #6 of each timeslot. In existing Release 8/9/10 transmission schemes, the location of the pilot signals may be predetermined, and hence a WTRU may be unable to vary the position of the pilot signals based on link and/or channel conditions. Additionally, due to the several design considerations for these transmission schemes, PUCCH transmissions may be performed in accordance with a frequency hopping scheme. For example, the frequency hopping scheme may be performed across the UL system bandwidth over the two timeslots in a subframe. Moreover, PUSCH spatial multiplexing and/or frequency-domain scheduling gains have led to pilot signal designs such that the transmitted pilot signals are orthogonal between WTRUs transmitting on the same resource blocks. Modification of such a scheme may allow for improved link coverage, but may affect other aspects of UL system design.

To further increase UL coverage, the WTRU and/or eNB may be configured to adjust the allowed one-way UL Uu delay budget for a transmitted packet. For example, typically a 50 ms air interface delays is deemed to be acceptable for UL transmission. The UL Uu interface delay may be a portion of the overall ear-to-mouth VoIP delay, for example along with WTRU and eNB processing times, codec delays, interface signaling durations, and/or other delay sources. Allowing for longer air interface delays may allow for more energy to be collected from each VoIP packet during the lifetime of the HARQ process. In other words, more retransmissions may be used, increasing the likelihood of a successful decoding.

However, increasing the allowed one-way UL delays over the air interface may result in one or more trade-offs with other aspects of the system design. To illustrate such a tradeoff, consider an example where the allowable UL transmission delays are increased from a typical value of about 50 ms to a value such as 70 ms. In the presence of TTI bundling, such a change may allow up to 20 TTIs to be used for transmission of a packet instead of a typical maximum of 12. The resulting increased combining gains may result in higher UL coverage. However, the mouth-to-ear delay for voice typically should not exceed 280 ms to ensure a minimum level of voice quality. For increased voice quality, typical end-to-end delays of the order of approximately 200 ms or less may be used to achieve a suitable voice quality. Thus, there may be limited flexibility in allowing the maximum air interface delay to increase while still maintaining the 280 ms mouth-to-ear delay time. In existing wireless systems including LTE, the portion allocated to Uu one-way delays is typically in the order of 50 ms (the remainder being absorbed by network and processing delays). Therefore, in practice the typical 50 ms delay budget numbers may be increased to delay values of the order of 60 or 70 ms for limited gain, but not much beyond such values if the mouth-to-ear delay is to be met according to current processing techniques.

A number of techniques, methods, and systems are disclose herein to improve the reception of UL transmission in noise-limited and/or power limited scenarios. These methods are designed to increase the available signal energy and/or making more efficient use of the available signal energy at the receiver for processing UL transmissions. The proposed methods and systems described herein may be applied individually or in any combination.

In order to limit the applicability of one or more of the methods or systems described herein to WTRUs that are most likely to experience uplink coverage problems (e.g., thereby allowing WTRUs that are not affected by adverse UL conditions to utilize legacy UL transmission techniques), the methods and systems described herein may be applied when a WTRU enters or operates in a "Coverage Limited Mode" or a "Power Limited Mode." In these modes, the WTRU may be configured to implement one or more of methods or systems described herein to improve link coverage. In an example, WTRUs that are not in a "Coverage Limited Mode" or a "Power Limited Mode" (e.g., "Normal Mode") may operate according to existing LTE Release 8 or Release 10 UL transmission specifications.

A WTRU that is operating in "Normal Mode" may be triggered to transition to "Coverage Limited Mode" by an eNB, for example using RRC signaling. In an example, the WTRU may be configured by an eNB for operation in "Normal Mode" and "Coverage Limited Mode" through RRC signaling and the WTRU may determine the appropriate mode of operation for a given time instance based on observed conditions and/or indications received from the eNB. For example, the mode of operation (e.g., "Normal" vs. "Coverage Limited") may be configured dynamically by the eNB by the transmission of a MAC Control Element that indicates a specific mode or operation and/or indicates to the WTRU that it should toggle between modes (e.g., switch from its current mode to the other mode). The determination by the eNB to change the mode of operation of a WTRU may be based on, but not limited to, UL power headroom (UPH) measurement reports from the WTRU and/or a request from a WTRU to change from "Normal Mode" to "Coverage Limited Mode." In an example, the WTRU may autonomously determine which mode of operation to use for UL transmission, (e.g., "Normal Mode" or "Coverage Limited Mode"). The determination UL mode may be based on UPH or other measurements.

However, the methods and systems described herein for improving UL coverage may be applicable to WTRUs that are operating under normal radio coverage conditions. For example, many of the methods and systems described herein (e.g., utilizing "fast HARQ" or HARQ with a shorter RTT, utilizing "long TTIs," utilizing dedicated PUSCH allocations, utilizing variations in reference signal design, utilizing different types of PUSCH modulation, utilizing multiple transmission schemes, utilizing multiple UL reception points, utilizing protocol overhead reduction techniques, and/or the like in any combination) may be incorporated into regular WTRU operation without explicit differentiation between a "Coverage Limited Mode" and a "Normal Mode." Therefore, any WTRU implementing one or more of the systems or methods described herein for improving UL coverage may be considered to be operating in "Coverage Limited Mode." In this sense, in some examples a WTRU may operate in a "Coverage Limited Mode" by implementing over or more of the UL coverage improvement techniques described herein (e.g., utilizing "fast HARQ" or HARQ with a shorter RTT, utilizing "long TTIs," utilizing dedicated PUSCH allocations, utilizing variations in reference signal design, utilizing different types of PUSCH modulation, utilizing multiple transmission schemes, utilizing multiple UL reception points, utilizing protocol overhead reduction techniques, and/or the like in any combination).

Thus, although one or more systems or methods described herein may be described with reference to operation in "Coverage Limited Mode" or "Power Limited Mode," these systems and methods may also be implemented in normal WTRU operation. Thus, the techniques described herein should not be read to be applicable only to WTRUs operating in a certain mode of operation unless specifically stated otherwise.

In an example, a WTRU may operate one or more (or all) HARQ processes with a shorter HARQ round trip time (RTT) (e.g., 4 subframes) than a default HARQ RTT (e.g., 8 subframes). For example, a WTRU in "Coverage Limited Mode" or "Power Limited Mode" may be configured to operate some or all HARQ processes using a shorter RTT. For example, methods may be defined to dynamically adjust the HARQ RTT for the one or more HARQ process(es) and/or to dynamically change the number of subframes used for transmission of a transport block (e.g., TBs that span multiple subframes may be used and/or the number of subframes used for transmission of a TB may be altered dynamically, for example based on channel conditions).

When referred to herein, the term HARQ process may exclude a HARQ process related to reception of system broadcasts (e.g., HARQ process may be used to refer for HARQ processes used for transmissions that are dedicated to the WTRU). Additionally, when referred to herein, the term "bundling" may be used to refer to a HARQ operation by which a HARQ entity may invoke the same HARQ process for each transmission that may be part of the same bundle. For example, when bundling is used, retransmissions within a bundle may be non-adaptive and may be triggered without waiting for feedback from previous transmissions according to the size of the bundled transmission. However, the methods described herein are not limited to such a type of bundling and may be equally applicable to other form of transmission over multiple subframes including when the transmission of a single transport block may be performed over a plurality of subframes. In such an embodiment, the bundle size may, for example, correspond to the transmission time for the transport block.

For a given HARQ process, a typical processing sequence may include the scheduling of the HARQ process, the transmission for the HARQ process, and/or reception of feedback for the HARQ process. For example, a WTRU may receive downlink control signaling that indicates a grant for an uplink resource (e.g., dynamic scheduling). For retransmissions, the WTRU may perform an autonomous synchronous HARQ retransmission without receiving any downlink control signaling for the concerned HARQ process. In case of semi-persistent scheduling (SPS), the WTRU may use the configured grant in the applicable subframe if the WTRU does not receive dynamic scheduling information for the corresponding HARQ process. Assigning HARQ resources either implicitly or explicitly for dynamic scheduling and SPS may be referred to as scheduling of the HARQ process(es).

A WTRU may perform a transmission on the PUSCH for a given HARQ process according to the allocated uplink resource. For example, the allocated uplink resource may be dynamically scheduled and/or configured with semi-persistent scheduling. In some situations, such as autonomous synchronous HARQ retransmissions, rather than the eNB allocating specific UL resources for a retransmission using a dynamic grant, the retransmission times/opportunities for HARQ may be based on implicit rules. Allocating resources for transmission/retransmission either explicitly or implicitly may be referred to as transmission for the HARQ process.

A WTRU may receive HARQ feedback on the PHICH, on the physical downlink control channel (PDCCH), and/or on both the PHICH and the PDCCH. The feedback may indicate whether the eNB successfully decoded a previous transmission corresponding to the applicable HARQ process. The feedback indication may be referred to as reception of feedback for the HARQ process.

In an example, the timing relationships between the scheduling of the HARQ process, transmission for the HARQ process, and reception of feedback for the HARQ process may be varied for a given HARQ process. As a reference and for purposes of explanation and illustration, the subframe that corresponds to an action that is a timing reference for some future action may be referred to as subframe (n). The following timing relationships and descriptors may be used throughout this document. For example, if grant reception may occurs in subframe (n), HARQ transmission may occur in subframe (n+x) (e.g., the HARQ transmission/data transmission may occur x subframes that the grant is received). Thus, the subframe utilized for HARQ transmission may be referred to as n+x. In another example, if the HARQ transmission occurs in subframe (n), then HARQ feedback reception may occur in subframe (n+k) (e.g., the HARQ feedback may be received k subframes after the HARQ transmission associated with the received HARQ feedback was transmitted). The subframe utilized for HARQ feedback may be referred to as n+k. In another example, if HARQ feedback occurs in subframe (n), the WTRU-autonomous synchronous HARQ retransmission may occur in subframe (n+y) (e.g., a HARQ retransmission may occur y subframes after a NACK is received). The subframe used for WTRU-autonomous synchronous HARQ retransmission may be referred to as n+y.

In the examples included herein, unless n+y is used explicitly, the timing delay from HARQ transmission to HARQ feedback may be equivalent or equal to that from HARQ feedback reception to a HARQ retransmission (e.g., represented by n+x). In other words, the corresponding timing of a subframe used for WTRU-autonomous synchronous HARQ retransmission may coincide with the subframe in which a WTRU may possibly receive a dynamic scheduling for the concerned HARQ process.

In an example, the HARQ RTT for a given HARQ process may be further generalized as the minimum number of subframes that may be utilized and/or needed for a HARQ process to receive downlink control information that schedules the HARQ process, to perform the transmission x subframes later, and to receive HARQ feedback x subframes after the transmission. When TTI bundling is used, the timing of the HARQ feedback may implicitly also include the length of the bundle in subframes. For example, for a bundle of TTI_BUNDLE_SIZE (e.g., TTI_BUNDLE_SIZE=4), the timing of the HARQ feedback may be adjusted such that it may be TTI_BUNDLE_SIZE-1 (e.g., 3) subframes later than if bundling is not used for the transmission. In an example embodiment, TTI_BUNDLE_SIZE may vary from one transmission to another, for example based on various transmission parameters and channel conditions. For LTE Release 8, x=k=4 and the HARQ RTT may therefore be 8 subframes. As such, x=k=4 and a HARQ RTT of 8 subframes may be referred to herein as the default HARQ values.

The Maximum HARQ RTT for a given HARQ entity may be equal to the HARQ RTT of the HARQ process that has the largest value for x+k. For example, if all HARQ processes for a given HARQ entity (and/or the WTRU) operate with x=k=2, then the Maximum HARQ RTT may be 4 subframes. As another example, if two HARQ processes operate with x=k=2, and a third HARQ processes operates using the default values, then the Maximum HARQ RTT for the HARQ entity may be 8 subframes. Thus the Maximum HARQ RTT for a given HARQ entity may be the maximum or largest possible HARQ RTT for any of the HARQ processes served by that HARQ entity. Thus, if the default values are used, the Maximum HARQ RTT may correspond to a HARQ RTT of 8 subframes.

The maximum number of active HARQ processes for WTRU and/or for a given HARQ entity may be equal to the number of HARQ processes that are available for an initial uplink transmission within the Maximum HARQ RTT. For example, if all HARQ processes operate with x=k=2, then the WTRU may perform uplink transmissions using up to four different HARQ processes of the HARQ entity during a given HARQ RTT. For example, the WTRU may perform up to 2 transmissions per HARQ process during the default HARQ RTT of 8 subframes. HARQ processes that are not be addressed may be suspended, stopped, and/or flushed.

As an example, if two HARQ processes operate with x=k=2 while the others operate with the default values x=k=4, then the WTRU may perform uplink transmissions using up to six different HARQ processes of the HARQ entity during a given HARQ RTT. In this example, the WTRU may perform up to 2 transmissions for the processes using x=k=2, while performing at most one for the other processes during the default HARQ RTT of 8 subframes.

A WTRU may assign a HARQ process identity (ID) for a HARQ process when the WTRU performs a new transmission. For example, if synchronous HARQ is used, the WTRU may assign an identity to the HARQ process that is linked to the timing of the subframe. For example, the WTRU may assign HARQ process ID=n to a HARQ process that is associated with an initial transmission in subframe(n). Then, HARQ process n may be used for other initial transmissions that occur in subframes that are some integer multiple of x+k subframes after subframe(n) (e.g., subframe (n+(x+k)), subframe(n+2(x+k)), subframe(n+2(x+k)), etc.). beginning with the subframe in which the WTRU performed the initial transmission for the HARQ process (e.g., subframe(n)). For example, if the WTRU operates with x=k=2 for all HARQ processes of a given HARQ entity, then according to the above, the HARQ RTT for all of HARQ processes may be equal to the Maximum HARQ RTT (e.g., 4 subframes). Thus, if x=k=2 and HARQ process n is associated with an initial transmission in subframe(n), then HARQ process n may also be used for transmissions occurring in subframe(n+4), subframe(n+8), subframe(n+12), etc. In this example, there may be up to 4 HARQ processes that may be addressed in a given RTT. Therefore, in an example the HARQ processes IDs may range from 0 to 3.

Figure 2:
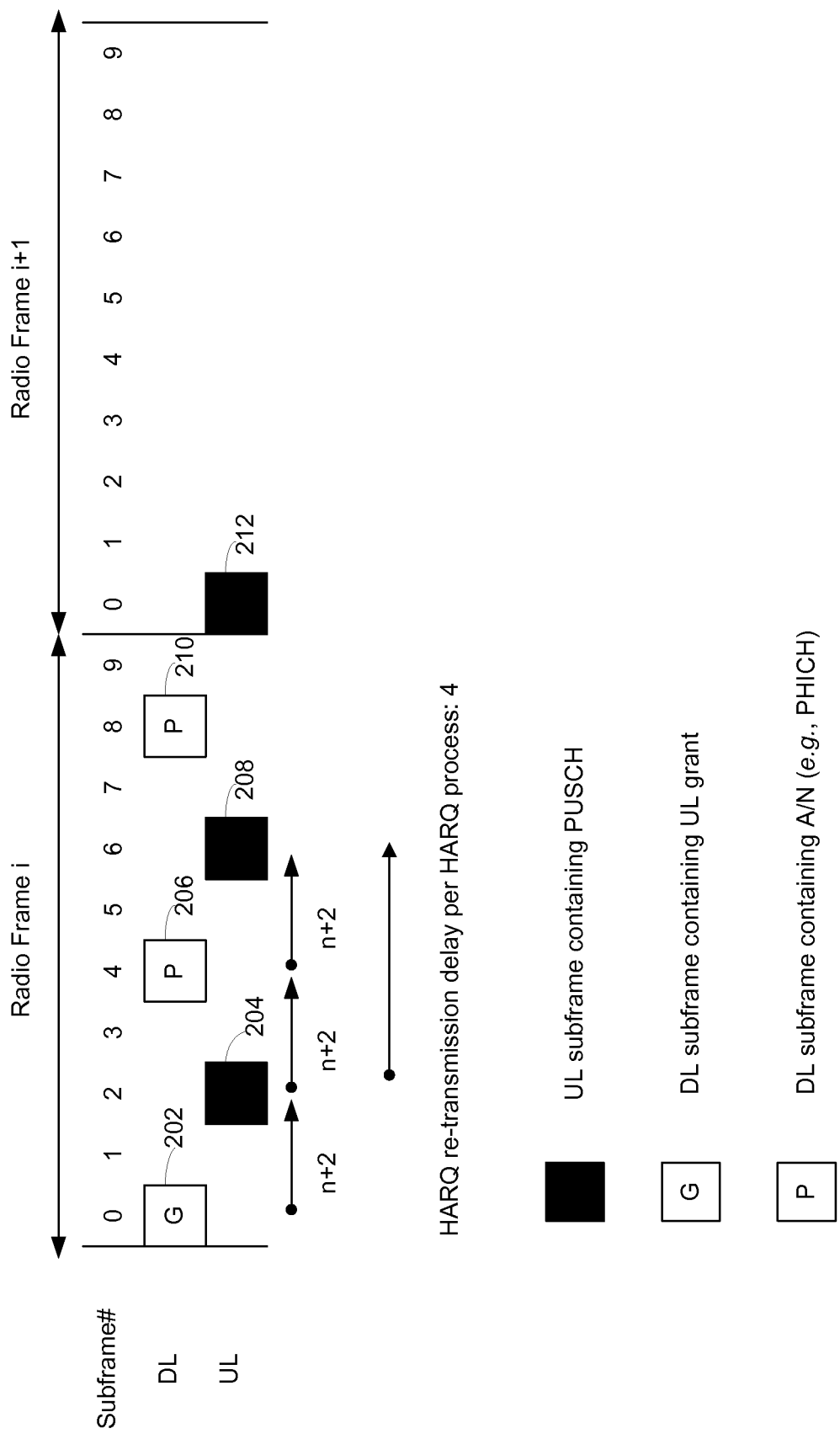
FIG. 2 illustrates example operation of a single fast hybrid automatic repeat request (HARQ) process.

FIG. 2 illustrates an example of HARQ process operation for a HARQ entity where the WTRU operates with x=k=2 for a HARQ process of the HARQ entity. As illustrated in FIG. 2, during subframe(0) of Radio Frame i, the WTRU may receive Grant 202, for example via the PDCCH, which may be a grant of UL resources. Since x=2, in subframe(2), the WTRU may transmit and UL Transmission 204 on the PUSCH in the resources assigned by Grant 202. In subframe (4), the eNB may send HARQ Acknowledgement/Non-acknowledgement (A/N) Feedback 206 to the WTRU, for example via the PHICH. HARQ A/N Feedback 206 may indicate whether or not the eNB successfully received UL Transmission 204. If HARQ A/N Feedback 206 indicates that UL Transmission 204 was not successfully received, then in subframe(6), the WTRU may send UL Retransmission 208. In an example, if HARQ A/N Feedback 206 had indicated that the eNB had successfully received UL Transmission 204, the subframe(4) may have included a subsequent UL grant for subframe(6) (e.g., not illustrated in FIG. 2). In this example, the same HARQ process used for UL Transmission 204 could have been used for the new UL transmission in subframe(6); however, since HARQ A/N Feedback 206 indicated a negative acknowledgement, the HARQ process is used to send a UL Retransmission 208 in subframe(6), which may be an retransmission of UL Transmission 204. Similarly, in subframe(8), the eNB may send HARQ A/N Feedback 210 to the WTRU, for example via the PHICH, to indicate whether or not the eNB successfully received UL Retransmission 208 (e.g., whether the eNB was able to successfully combine UL Retransmission 208 and UL Transmission 204 to decode the UL data). If HARQ A/N Feedback 210 indicates that the eNB was still not able to successfully decode the UL date, then in subframe(0) for the next Radio Frame (e.g., Radio Frame i+1), the WTRU may send UL Retransmission 212. Each of the UL transmissions illustrated in FIG. 2 may be associated with the same HARQ process.

Figure 3:
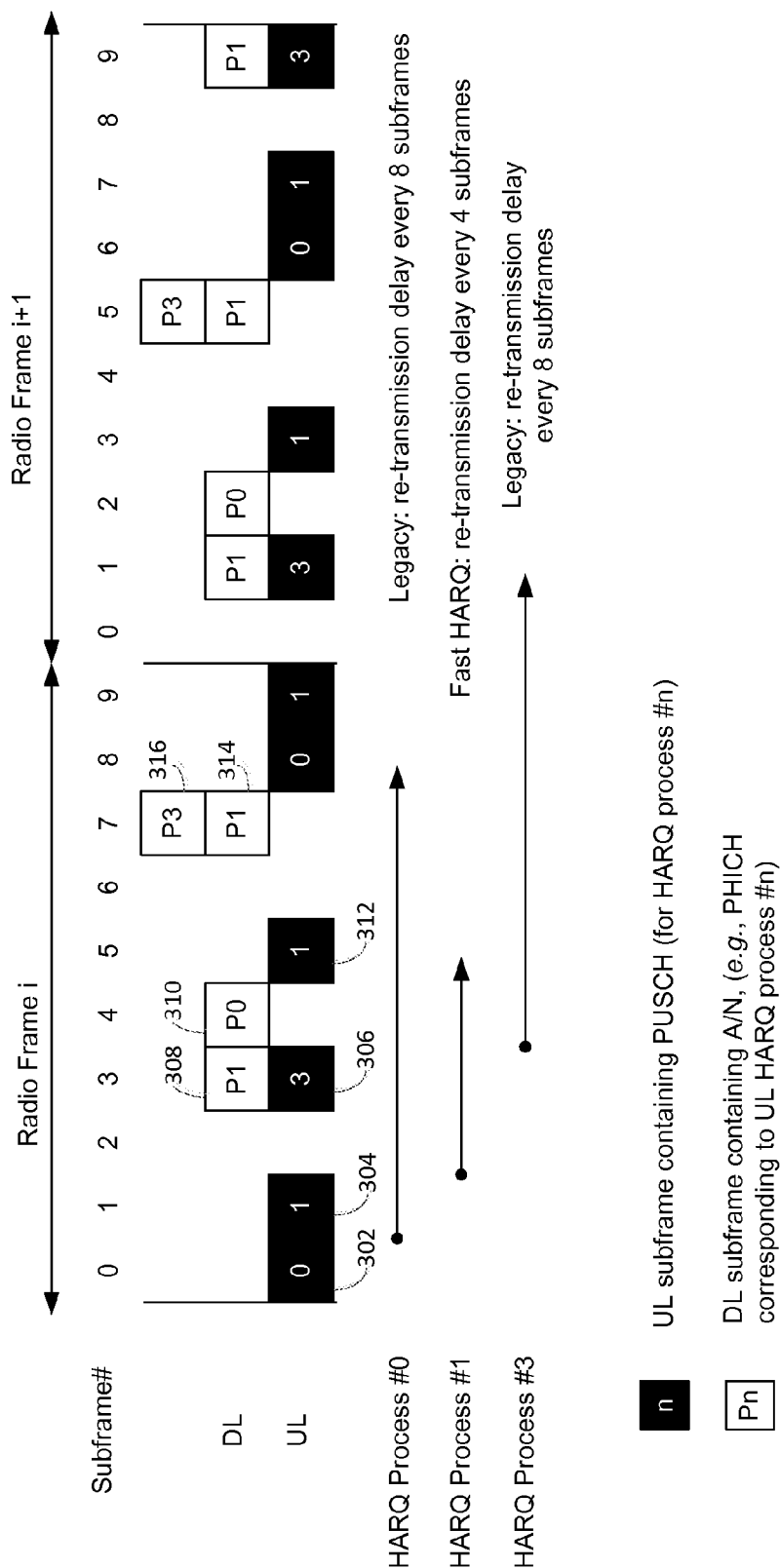
FIG. 3 illustrates example operation of a plurality of HARQ processes with various timings.

As another example, for a given HARQ entity the WTRU may operate with two HARQ processes with x=k=2, where a first HARQ process ID for a first process may corresponds to n=0 and a second HARQ process ID for a second process may corresponds to n=4. The remaining HARQ processes may operate with x=k=4. Therefore for this HARQ entity, the Maximum HARQ RTT may be 8 subframes, the maximum number of active HARQ processes may be 6 processes, the HARQ processes IDs may range from 0 to 5, HARQ processes #0 and #3 may use a 4 ms RTT, and HARQ processes #1, #2, #4, and #5 may use an 8 ms RTT. FIG. 3 illustrates an example of HARQ process operation using a similar case, illustrating operation with one HARQ process with x=k=2 (e.g., HARQ Process #1), while other processes may operate with x=k=4 (e.g., HARQ Process #0 and HARQ Process #3).

For example, as illustrated in FIG. 3, during subframe(0) of Radio Frame i, the WTRU may perform UL transmission 302, which may be associated with HARQ process #0. At subframe(1), the WTRU may perform UL Transmission 304, which may be associated with HARQ process #1. At subframe(3), the WTRU may perform UL transmission 306, which may be associated with HARQ process #3. Additionally, during subframe(3) the WTRU may receive HARQ A/N Feedback 308, which may provide HARQ feedback for UL Transmission 304 corresponding to HARQ process #1. During subframe(4), the WTRU may receive HARQ A/N Feedback 310, which may provide HARQ feedback for UL Transmission 302 corresponding to HARQ process #0. At subframe(5), the WTRU may send UL Transmission 312 using HARQ process #1. UL Transmission 312 may be a new initial transmission if HARQ A/N Feedback 308 indicated that UL Transmission 304 was successfully received or may be a retransmission of UL Transmission 304 is HARQ A/N Feedback 308 indicates that UL Transmission 304 was not successfully received. During subframe(7), the WTRU may receive HARQ A/N Feedback 314, which may provide HARQ feedback for UL Transmission 312 corresponding to HARQ process #1, and may also receive HARQ A/N Feedback 316, which may provide HARQ feedback for UL Transmission 306 corresponding to HARQ process #3. Similar transmissions may continue where transmissions associated with HARQ process #1 utilize a RTT=4 ms subframes and x=k=2 and where transmissions associated with HARQ process #0 and/or HARQ Process #3 utilize a RTT=8 ms subframes and x=k=4.

In an example, the WTRU may retransmit the same transport block using a second HARQ process that follows a first HARQ process by x+k subframes (e.g., possibly increasing redundancy version) when x+k is smaller than the default value. This may be conceptually similar to using a single HARQ process that is active every x+k subframes, but would maintain the same number of active HARQ processes as for the default operation.

Figure 4:
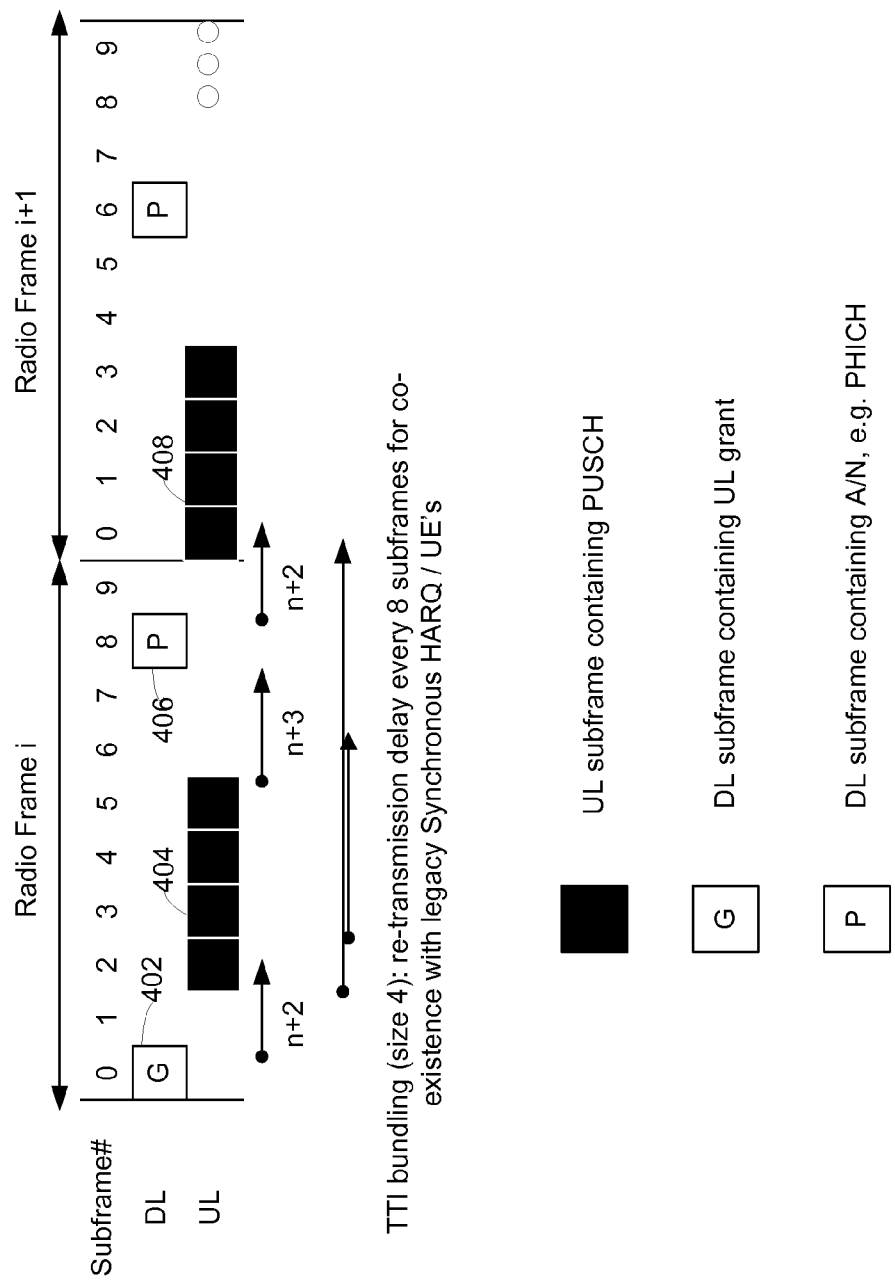
FIG. 4 illustrates another example operation of a single HARQ process.

As an example, for a given HARQ entity the WTRU may operate with two HARQ processes, each with x=2, k=3, and configured with TTI bundling of 3 repetitions (e.g., TTI_BUNDLE_SIZE=4). Accordingly, for the concerned HARQ entity the maximum HARQ RTT may be 8 subframes (e.g., x+k+(TTI_BUNDLE_SIZE-1)=2+3+(4-1)=8), the maximum number of active HARQ processes may 2 processes (and/or 2 times 4 processes of which the last 3 perform retransmission of the same transport block for each bundle), the HARQ processes identity may range from 0 to 1, and the HARQ processes #0 and #1 may use a 8 ms RTT. FIG. 4 illustrates the operation of a single process in this case, where process #0 may start in subframe #2 of the first radio frame (and process #1, although not shown in FIG. 4, may start in subframe #6 of the same radio frame).

As shown in FIG. 4, an LTE TTI bundling mode (e.g., a TTI bundling size 4 is illustrated in FIG. 4) may now use a shorter A/N timeline of n+2/n+3. For example, at subframe (0), the WTRU may receive UL Grant 402. Two subframes later (e.g., x=2), the WTRU may begin transmitting data according to the received grant. Thus, starting at subframe (2), the WTRU may transmit UL Transmissions 404, which may be a TTI Bundled transmission with TTI_BUNDLE_SIZE=4. For a bundled transmission in this example, assuming the UL grant is received in subframe(n), then the WTRU may transmit the TB first in subframe(n+2), and then retransmit the same TB in subframe(n+3), subframe(n+4), and subframe(n+5) (e.g., n=2 for the example shown in FIG. 4). A corresponding PHICH A/N Transmission 406 may occur in subframe (n+8) (e.g., 3 subframes delay), followed by a re-transmission of the bundle via UL Transmissions 408, which may start in subframe(n+10) (e.g., 2 subframe delay) with retransmissions occurring in subframe(n+11), subframe(n+12), and subframe(n+13).

More generally, if the bundle size may be dynamically adapted, assuming that the a bundle transmission begins in subframe(b), then the bundle may be transmitted in subframes [b, b+(TTI_BUNDLE_SIZE-0], for example, inclusively. The corresponding PHICH for the bundle may occur in subframe(b+(TTI_BUNDLE_SIZE-1)+k), followed by a retransmission of the bundle (e.g., if a negative acknowledgement is received) begging in subframe (b+(TTI_BUNDLE_SIZE-1)+k+y). For the retransmission, if the bundle size may be dynamically adapted, a different bundle size may be used for the retransmission (e.g., a TTI_BUNDLE_SIZE different than 4 may be used after receiving a negative acknowledgement via the PHICH).

The relationships expressed above may also be expressed relative to a UL grant that is received in subframe(n). For example, assuming that x=y=2, k=3 and TTI_BUNDLE_SIZE=4 (e.g., as illustrated in FIG. 4), then if the original UL grant is received in subframe(n), then since x=2 and TTI_BUNDLE_SIZE=4, the UL bundled transmissions may occur in subframes[(n+x), (n+x)+(TTI_BUNDLE_SIZE-1)] (e.g., subframe(n+2), subframe(n+3), subframe (n+4), and subframe(n+5), where n=0 for the example illustrated in FIG. 4). The A/N transmission for the bundle may then be received by the WTRU in subframe((n+x)+(TTI_BUNDLE_SIZE-1)+k), which may correspond to subframe((0+2)+(4-1)+3))=subframe(8). If the A/N indicated that the eNB did not successfully receive the TB transmitted in the bundle, then at subframe((n+x)+(TTI_BUNDLE_SIZE-1)+k+y)=subframe((0+2)+(4-1)+3+2))=subframe(10)=subframe(0) of the next radio frame, the WTRU may begin retransmission of the bundle (e.g., using the same or a different TTI_BUNDLE_SIZE). As may be appreciated, since there may be 10 subframes per radio frame in LTE, if a second HARQ event (e.g., UL grant, HARQ transmission, A/N transmission, HARQ retransmission, etc.) is configured to occur 10 subframes after a first HARQ event(e.g., UL grant, HARQ transmission, A/N transmission, HARQ retransmission, etc.), then the second HARQ event may occur in the same subframe number as the first HARQ event, but may be associated with the next radio frame in the wireless communication system.

The WTRU may operate such that different HARQ processes may use different values for x, k, y, and/or TTI_BUNDLE_SIZE according to one or more of the following methods. For example, different HARQ processes may have different x, k, y, and/or TTI_BUNDLE_SIZE for the same HARQ entity. Thus the value of x, k, y, and/or TTI_BUNDLE_SIZE may be assigned and/or determined on a per HARQ process basis. The WTRU may be configured by an eNB with specific values of x, k, y, and/or TTI_BUNDLE_SIZE per HARQ process, or subset thereof, for example using Radio Resource Control (RRC) signaling. In an example, the values of x, k, y, and/or TTI_BUNDLE_SIZE may be determined on a per HARQ entity basis. For example, different HARQ entities may have different x, k, y, and/or TTI_BUNDLE_SIZE values, but the values for that HARQ entity may be consistent across the HARQ processes associated with that HARQ entity.

In an example, one or more HARQ process(es) may switch between different values of one or more of x, k, y, and/or TTI_BUNDLE_SIZE dynamically. The WTRU may change the values of one or more of x, k, y, and/or TTI_BUNDLE_SIZE for one or more HARQ processes based on implicit determinations and/or explicit signaling (or some combination thereof). The determination to adjust the one or more of the HARQ timing values and/or the TTI bundle size may be designed to adjust the HARQ RTT (e.g., the WTRU may be determine and/or be configured to use faster or slower HARQ), for example on a per HARQ entity and/or on a per HARQ process basis. The WTRU may be configured to operate some or all HARQ processes using a TTI bundle of varying length rather than using a default TTI bundle length of 4 (e.g., the default TTI Bundle Length may refer to the LTE R8/R9/R10/R11 Bundle Length of 4). As noted above, the timing relationships described herein may be applicable to HARQ processes not including the HARQ process related to reception of system broadcasting.

For example, Layer 1 (e.g., physical layer—L1) signaling may be utilized to dynamically indicate the values of one or more of x, k, y, and/or TTI_BUNDLE_SIZE to the WTRU. In some examples, it may be assumed that x=y, so the physical layer signaling may explicitly and/or implicitly indicate one or more of x, k, and/or TTI_BUNDLE_SIZE, and the WTRU may determine y based on the value of x. In another example, the value y may remain static, and the WTRU may determine changes to one or more of x, k, and/or TTI_BUNDLE_SIZE dynamically based on Layer 1 signaling.

For example, the WTRU may receive downlink control signaling (e.g., via the PDCCH, for example as part of an uplink grant) that indicates what values of x, k, y, and/or TTI_BUNDLE_SIZE should be used for one or more HARQ processes. For example, DCI corresponding to a UL grant may be received via the PDCCH. The DCI corresponding to the uplink grant may specify a specific HARQ process identification (ID) to be used for the UL grant and/or may indicate the values to use for one or more of x, k, y, and/or TTI_BUNDLE_SIZE associated with this UL grant. As an example, the specific values themselves (and/or an indication of what configured values) for x, k, y, and/or TTI_BUNDLE_SIZE may be included in the DCI received on the PDCCH. The specific values may be signaled, an index value may be signaled, and/or the values may be set based on a flag. In the presence of TTI bundling, the value of k may be applied from the last transmission of the bundle (e.g., the timing of the HARQ feedback may vary dynamically and implicitly as a function of the size of the bundle for a given transmission). In another example, the value of k may be applied from the first transmission of the bundle.

If a one or more flags are used for indicating the appropriate values for one or more of x, k, y, and/or TTI_BUNDLE_SIZE, the WTRU may determine whether to change one or more of x, k, y, and/or TTI_BUNDLE_SIZE based on the value of the flag. In an example, if a single flag is included in the DCI, the flag may be configured to toggle the WTRU between various values of one or more of x, k, y, and/or TTI_BUNDLE_SIZE. For example, there may be one or more possible pre-configured values for x, k, y, and/or TTI_BUNDLE_SIZE. The flag may indicate whether the WTRU should switch to the next pre-configured value of one or more of x, k, y, and/or TTI_BUNDLE_SIZE. In an example, each of x, k, y, and/or TTI_BUNDLE_SIZE may be associated with an individual flag. Thus, a first flag may be used to toggle the value x, a second flag may be used to toggle the value of k, a third flag may be used to toggle the value of y, a fourth flag may be used to toggle the value of TTI_BUNDLE_SIZE, etc. In an example, one or more flags may be used to indicate whether the values of one or more of x, k, y, and/or TTI_BUNDLE_SIZE may be changed dynamically. For example, one or more flags may be used to indicate that x, k, and y are to remain statically configured, but that TTI_BUNDLE_SIZE may be dynamically changed. The DCI and/or flags included in the DCI may be applicable to a single HARQ parameter value (e.g., x, k, and/or y), to the TTI_BUNDLE_SIZE, and/or to a combination of HARQ parameter values and/or TTI_BUNDLE_SIZE.

In an example, the WTRU may be configured with one or more cell-radio network temporary identifiers (C-RNTIs), and a given C-RNTI may be associated with certain values of one or more of x, k, y, and/or TTI_BUNDLE_SIZE. For example, the a first C-RNTI used by the WTRU may be associated with a first set of values for one or more of x, k, y, and/or TTI_BUNDLE_SIZE. A second C-RNTI used by the WTRU may be associated with a second set of values for one or more of x, k, y, and/or TTI_BUNDLE_SIZE. If the WTRU receives dynamic scheduling information for a UL transmission (e.g., a UL grant on the PDCCH) and is able to successfully decode the scheduling information using the first C-RNTI, then the WTRU may determine to use the first set of values for one or more of x, k, y, and/or TTI_BUNDLE_SIZE. If the WTRU is able to successfully decode the scheduling information using the second C-RNTI, then the WTRU may determine to use the second set of values for one or more of x, k, y, and/or TTI_BUNDLE_SIZE. In an example, the first C-RNTI may be associated with the default values for one or more of x, k, y, and/or TTI_BUNDLE_SIZE (e.g., x=4, k=4, y=4, and/or TTI_BUNDLE_SIZE=4), while the second C-RNTI may be associated with non-default values for one or more of x, k, y, and/or TTI_BUNDLE_SIZE. The non-default values may be configured using RRC signaling.

Layer 1 signaling may be used to dynamically change values for one or more of x, k, y, and/or TTI_

BUNDLE_SIZE on a per HARQ process basis. For example, the appropriate values for one or more of x, k, y, and/or TTI_BUNDLE_SIZE may be received as part of dynamic scheduling information that indicates a new uplink transmission. In an example, the values for one or more of x, k, y, and/or TTI_BUNDLE_SIZE received in dynamic scheduling information may remain valid until the HARQ process completes its current transmission/retransmission processing. For example, the WTRU may use the indicated values for one or more of x, k, y, and/or TTI_BUNDLE_SIZE for the entire transmission for the concerned HARQ process and/or until some predefined event.

In an example, the WTRU may determine to change the values for one or more of x, k, y, and/or TTI_BUNDLE_SIZE when the WTRU receives HARQ ACK feedback. In an example, the WTRU may determine to change the values for one or more of x, k, y, and/or TTI_BUNDLE_SIZE when the WTRU receives control signaling (e.g., a PDCCH transmission) that indicates that the WTRU has been allocated UL resources for a new transmission for the concerned HARQ process. For example, if a previous value for one or more of x, k, y, and/or TTI_BUNDLE_SIZE had been configured for a given HARQ process, the WTRU may be configured to revert to one or more default values based on receiving new control signaling for the given HARQ process. In an example, rather than returning to the default values, the WTRU may be configured to change to a specific value that may or may not be indicated in the control signaling (e.g., may revert to one or more specified values that may be different than the R8/R9/R10/R11 default values for one or more of x, k, y, and/or TTI_BUNDLE_SIZE). In an example, the WTRU may determine to change the values for one or more of x, k, y, and/or TTI_BUNDLE_SIZE when the maximum number of HARQ retransmission(s) is reached for the concerned HARQ process.

In an example, the WTRU may continue to utilize a configured value for one or more of x, k, y, and/or TTI_BUNDLE_SIZE until a new value is received. For example, if a first set of values for one or more of x, k, y, and/or TTI_BUNDLE_SIZE is received (e.g., via scheduling information and/or the like), the WTRU may continue to treat the received values as valid until the WTRU receives signaling that indicates a new value for the one or more of x, k, y, and/or TTI_BUNDLE_SIZE. As an example, if the WTRU receives a new value for x, but not for k, y, and/or TTI_BUNDLE_SIZE, the WTRU may determine that the previous value for x is no longer valid, but that the previous values for k, y, and/or TTI_BUNDLE_SIZE are still valid (e.g., the WTRU treats previous values for HARQ/TTI Bundling parameters as no longer valid only for the HARQ/TTI Bundling parameters for which a new value is received). In another example, if a new value is received for any of x, k, y, and/or TTI_BUNDLE_SIZE, the WTRU may determine that the previously received values for each of x, k, y, and/or TTI_BUNDLE_SIZE is/are no longer valid. For example, if the WTRU receives a new value for x, but not for k, y, and/or TTI_BUNDLE_SIZE, the WTRU may determine that the previous value for x is no longer valid, and that the previous values for k, y, and/or TTI_BUNDLE_SIZE are also no longer valid even though specific values for those parameters have not been received.

In an example, if the since specific values were not received for k, y, and/or TTI_BUNDLE_SIZE, the WTRU may determine to use default values for those parameters.

In an example, the WTRU may be configured to use the default values for one or more of x, k, y, and/or TTI_BUNDLE_SIZE until some other configuration of HARQ/TTI Bundling parameters is activated. For example, an eNB may configure the WTRU with some non-default configuration of HARQ/TTI Bundling parameters, for example using RRC signaling. The non-default configuration may be associated with non-default values for one or more of x, k, y, and/or TTI_BUNDLE_SIZE. The WTRU may then receive an activation message that indicates to the WTRU that the pre-configured non-default configuration should be utilized. The activation message may be sent by the eNB via a PDCCH order, an L1 activation command, MAC control element (CE), an RRC message, and/or some other control signaling that indicates that the WTRU should use a non-default HARQ parameter/TTI Bundling configuration. The WTRU may transmit HARQ feedback for the activation message.

The activation message may include the non-default values for one or more of x, k, y, and/or TTI_BUNDLE_SIZE and/or may indicate which of the one or more of x, k, y, and/or TTI_BUNDLE_SIZE parameters should use a non-default value included in a previously configured non-default configuration. If the WTRU had been previously configured to use more than one non-default HARQ parameter/TTI Bundling configuration, then the activation message may indicate which non-default HARQ parameter/TTI Bundling configuration should be used. In an example, the non-default values for x and/or k and/or the non-default HARQ parameter/TTI Bundling configuration may be valid once activated and may remain valid until they are deactivated or a new value(s) is activated. A deactivation message may be sent by the eNB via a PDCCH order, an L1 activation command, MAC CE, an RRC message, and/or some other control signaling that indicates that the WTRU should no longer use the non-default HARQ parameter/TTI Bundling configuration.

In an example, Layer 1 signaling may also be applied to configured values for one or more of one or more of x, k, y, and/or TTI_BUNDLE_SIZE on a per HARQ entity basis and/or on a per WTRU basis (e.g., rather than on a per HARQ process basis). For example, the Layer 1 signaling may be applicable to set or configure values for one or more of x, k, y, and/or TTI_BUNDLE_SIZE for a plurality of HARQ processes, such as each of the HARQ processes within a HARQ entity. As an example, the L1 activation and/or deactivation commands may be applicable per HARQ entity and/or for some or all of the HARQ entities of the WTRU (e.g., in case the WTRU is configured with multiple serving cells).

In an example Layer 2 (e.g., MAC) control signaling may be utilized to dynamically configure values for one or more of x, k, y, and/or TTI_BUNDLE_SIZE and/or to set or establish a HARQ/TTI Bundling parameters configuration. For example, MAC signaling may be used to activate a configuration for a shorter RTT (e.g., is to configure values of one or more of x, k, y, and/or TTI_BUNDLE_SIZE such that the RTT is less than the default value of 8 subframes). Upon receiving the MAC signaling indicating a change for one or more of x, k, y, and/or TTI_BUNDLE_SIZE, the WTRU may apply a configuration indicated by MAC signaling after a certain delay from the successful reception of the MAC CE that indicated that change. For example, the WTRU may wait for at least one default HARQ RTT to occur after receiving the MAC CE before changing. In another example, the WTRU may wait for one HARQ RTT corresponding to the RTT for the previous configured HARQ/TTI Bundling parameters configuration prior to applying the new configuration indicated by the MAC CE.

The WTRU may receive a MAC CE that indicates specific values of one or more of x, k, y, and/or TTI_BUNDLE_SIZE to be used for a given HARQ process, given HARQ entity, and/or for the WTRU. For example, specific values (or an indication of configured values using an index) for one or more of x, k, y, and/or TTI_BUNDLE_SIZE may be included in a MAC CE received on from the eNB. In an example, the MAC CE may not specifically include the values of x, k, y, and/or TTI_BUNDLE_SIZE, but may trigger the WTRU to transition to a different HARQ/TTI Bundling parameters configuration. The HA HARQ/TTI Bundling parameters configuration may be preconfigured via RRC signaling, and if there are multiple preconfigured HARQ/TTI Bundling parameters configurations, the MAC CE may indicate which HARQ/TTI Bundling parameters configuration to use. In an example, if there are multiple preconfigured HARQ/TTI Bundling parameters configurations, the MAC CE may not indicate which HARQ/TTI Bundling parameters configuration to use, but the WTRU may select the appropriate HARQ/TTI Bundling parameters configuration based on some implicit criteria.

The MAC CE signaling may be applicable to a plurality of HARQ processes, for example each of the HARQ processes associated with a given HARQ entity and/or each of the HARQ processes associated with some or all of the HARQ entities utilized by the WTRU. A MAC CE may be used to activate a previously configured HARQ/TTI Bundling parameters configuration for the WTRU. For example, the MAC CE may be a command that activates specific values of one or more of x, k, y, and/or TTI_BUNDLE_SIZE that had been previously configured for and/or provided to the WTRU. The values may be applicable per HARQ entity, and/or for each of HARQ entities of the WTRU (e.g., in case the WTRU is configured with multiple serving cells). In an example, the MAC CE may indicate what serving cell the MAC CE command applies to, for example if the command applies the HARQ entity associated with that serving cell but not to HARQ entities associated with other serving cells.

In an example Layer 3 (e.g., RRC) control signaling may be utilized to dynamically and/or semi-statically configure HARQ/TTI Bundling parameters configuration and/or specific values for one or more of x, k, y, and/or TTI_BUNDLE_SIZE. The WTRU may be configured by RRC with configurations for one or more of x, k, y, and/or TTI_BUNDLE_SIZE that may be applicable per cell, per WTRU, per HARQ process, and/or per type of transmission (e.g., SPS, dynamic, synchronized retransmissions, etc.).

The WTRU may receive an RRC configuration that indicates what values of one or more of x, k, y, and/or TTI_BUNDLE_SIZE may be used for one of more HARQ processes (e.g., an HARQ/TTI Bundling parameters configuration). The values may be configured per HARQ process, per HARQ entity (e.g., per serving cell), and/or for each of the HARQ processes of the concerned WTRU. In an example, the WTRU may perform a reconfiguration of the HARQ process and/or HARQ parameter/TTI Bundling configuration during an RRC Connection Reconfiguration procedure. In an example, the WTRU may be configured to perform reconfiguration of a HARQ process (e.g., establish new values for one or more of x, k, y, and/or TTI_BUNDLE_SIZE and/or re-validate the previous values for one or more of x, k, y, and/or TTI_BUNDLE_SIZE) and/or an RRC Connection Reconfiguration procedure when the receives control signaling that changes the active set of values for one or more of x, k, y, and/or TTI_BUNDLE_SIZE.

The timing of a frame and/or subframe may be used to determine values for one or more of x, k, y, and/or TTI_BUNDLE_SIZE. For example, the WTRU may determine the values of one or more of x, k, y, and/or TTI_BUNDLE_SIZE based on the timing of the subframe in which a given transmission (e.g., initial transmission, retransmission, final transmission, etc.) is scheduled to take place. In an example, the WTRU may determine the values of one or more of x, k, y, and/or TTI_BUNDLE_SIZE based on the timing of the subframe in which a grant for a given transmission was received. Such timing may be based on the position of the subframe during which the triggering event (e.g., HARQ transmission, UL grant, PHICH transmission, etc.) occurred within a frame (e.g., based on subframe number but not frame number) and/or relative to a window of more than 1 frame (e.g., 4 or 8 frames). As an example where the window may be greater than a frame, a WTRU may be configured to determine that TTI_BUNDLE_SIZE may be set to four for a transmission starting in the 20th subframe after the start of the window (e.g., the first subframe of the 3rd radio frame in the window). In another example, a WTRU may determine to use a TTI_BUNDLING_SIZE of two based on the transmission beginning to take place in the 22nd subframe after the start of the window (e.g., the third subframe of the 3rd radio frame in the window). The timing information (e.g., a configuration indicating the timing relationships that are based on the determination of when a reference even occurred) may be provided by higher layers (e.g., via RRC signaling).

In an example, one or more properties of an uplink transmission may be used to determine appropriate values for one or more of x, k, y, and/or TTI_BUNDLE_SIZE. For example, the WTRU may determine the values of for one or more of x, k, y, and/or TTI_BUNDLE_SIZE based on the properties of the resources allocated to a WTRU in a UL grant. If values for one or more of x, k, y, and/or TTI_BUNDLE_SIZE are determined based on a property of an UL grant, the values may be applicable to the transmission associated with the grant or to transmissions associated with the HARQ process utilized by the grant. As an example, properties of an UL transmission that may be used to determine values for one or more of x, k, y, and/or TTI_BUNDLE_SIZE to be used for transmitting the UL transmission (and/or any applicable retransmission) may include one or more of the resource block allocation (e.g., starting resource block (RB), number of RBs, etc.), a property of a transmitted and/or received DM-RS reference signal transmitted (e.g., the identity of which may be determined based on a field of a received grant), a property related to the transmission power (such as the transmission power itself, the power headroom, and/or the like), and/or the uplink frequency (e.g., carrier frequency). The properties of the received DM-RS that may be used by the WTRU to determine values for one or more of x, k, y, and/or TTI_BUNDLE_SIZE may include the base sequence, the cyclic shift, the hopping patterns thereof, the orthogonal cover code, and/or the like.

In an example, values for one or more of x, k, y, and/or TTI_BUNDLE_SIZE may be a function of the number of transmissions for a given transport block and/or for a given HARQ process. For example, the size of a bundle for a given HARQ transmission may be a function of the number of transmission and retransmission(s) for a given transport block. According to an example, a HARQ process may use a set of bundle size values (e.g., size_1, size_2, . . . , size N, where N may be equal to a total maximum number of HARQ transmissions for the process) that may be applicable to the transmission of a transport block for a given HARQ process. For example, such a sequence may be [8, 6, 4, 2] for a process for which the maximum number of retransmissions is equal to 3. In an example, a function may be used, for example where the bundle size may be halved for each retransmission of a transport block of a given HARQ process down to a minimum value (e.g., no smaller than 1). In an example, the WTRU may autonomously determine the size of the bundle using the function for non-adaptive WTRU-autonomous retransmissions.

In an example, the HARQ process may switch between different values for one or more of x, k, y, and/or TTI_BUNDLE_SIZE dynamically at a new HARQ transmission instance. For example, the WTRU may receive dynamic scheduling that indicates a new transmission for a given HARQ process. The scheduling information may include an indication that of the values for one or more of x, k, y, and/or TTI_BUNDLE_SIZE to be used for the HARQ process until the process completes. The WTRU may determine the identity of the HARQ process, may determine that the corresponding transmission may be performed in subframe n+x, and may expect HARQ feedback k subframes later. If the HARQ feedback is negative, the retransmission (e.g., either WTRU-autonomous, or dynamically scheduled) may occur y subframes later, and subsequent retransmission may follow the same timing until the process has completed.

In an example, a HARQ process may switch between different values for one or more of x, k, y, and/or TTI_BUNDLE_SIZE dynamically for each new HARQ transmission. For example, the WTRU may receive dynamic scheduling that may indicate a new transmission for a given HARQ process. The scheduling information may include an indication for one or more values for one or more of x, k, y, and/or TTI_BUNDLE_SIZE. For example, TTI_BUNDLE_SIZE=8 may be used for the HARQ process until the process is complete. For this example of a bundles size of 8, the WTRU may determine the identity of the HARQ process, may determine that it may perform the first transmission in the bundle in subframe n, and the remainder of the bundle from n+1 until n+7. The WTRU may also determine that it may expect HARQ feedback for the bundle as described herein. Retransmissions (e.g., WTRU-autonomous, and/or dynamically scheduled) may use the number of transmissions per bundle until the process is completed.

In an example, the HARQ process may switch between different values for one or more of x, k, y, and/or TTI_BUNDLE_SIZE dynamically per HARQ transmission and/or retransmission. As an example, the WTRU may receive dynamic scheduling that indicates a new transmission for a given HARQ process. The scheduling information may include an indication of the values for one or more of x, k, y, and/or TTI_BUNDLE_SIZE to be used for the initial transmission. The WTRU may determine the identity of the HARQ process, may determine that it may perform the corresponding transmission in subframe n+x, and may expect HARQ feedback k subframes later. For retransmissions, if the WTRU receives dynamic scheduling information, the dynamic scheduling information may include new values for one or more of x, k, y, and/or TTI_BUNDLE_SIZE. The WTRU may use new values indicated in the received control signaling (e.g., in the dynamic retransmission grant), otherwise if a dynamic grant is not received or the dynamic grant does not indicate the new values for one or more of x, k, y, and/or TTI_BUNDLE_SIZE, then the WTRU may use the default values for one or more of x, k, y, and/or TTI_BUNDLE_SIZE and/or may use the values for one or more of x, k, y, and/or TTI_BUNDLE_SIZE that were associated with the initial transmission.

In an example, the values for values for one or more of x, k, y, and/or TTI_BUNDLE_SIZE may be applied according to a set of predefined rules. For example, the WTRU may determine to apply a first HARQ/TTI Bundling parameters configuration for initial transmissions associated with a dynamic grants and a second HARQ/TTI Bundling parameters configuration for retransmissions. Continuing with this example, the WTRU may determine to apply a third HARQ/TTI Bundling parameters configuration for transmissions associated configured grants/SPS. In such as cases, the values for one or more of x, k, y, and/or TTI_BUNDLE_SIZE associated with the first, second, and/or third HARQ/TTI Bundling parameters configuration may be different.

For example, the WTRU may apply specific values for one or more of x, k, y, and/or TTI_BUNDLE_SIZE for uplink transmissions that are dynamically scheduled (e.g., granted via a PDCCH DCI). The WTRU may apply a second set of values for one or more of x, k, y, and/or TTI_BUNDLE_SIZE for uplink synchronized retransmissions (e.g., may apply also to asynchronous HARQ). In an example, the WTRU may apply a specific set of values for one or more of x, k, y, and/or TTI_BUNDLE_SIZE for uplink transmissions using a configured grant (e.g., may also be applicable to HARQ processes configured with a Semi-Persistent Scheduling grant). The values applied to configured grant transmissions/SPS transmissions may be different than values used for dynamically scheduled grants. Another type of transmission that may be associated with an individualized HARQ/TTI bundling parameters configuration may include transmission of msg3 using a grant received in a random access response (RAR). For example, the WTRU may apply specific values for one or more of x, k, y, and/or TTI_BUNDLE_SIZE for uplink transmissions of msg3 using a grant received in a RAR (e.g., these values may also apply to the HARQ process for RACH msg3 and/or RACH msg3 transmission). In an example, the WTRU may apply specific values for one or more of x, k, y, and/or TTI_BUNDLE_SIZE when cross-carrier scheduling is not configured for the concerned serving cell, for example if carrier aggregation is configured for the WTRU. In an example, the WTRU may apply specific values for one or more of x, k, y, and/or TTI_BUNDLE_SIZE for any and/or all uplink transmissions for which a HARQ feedback is expected.

In an example, if the WTRU determines that a HARQ process for a configured SPS grant uses timing and/or a bundle size (e.g., values for one or more of x, k, y, and/or TTI_BUNDLE_SIZE) that were different than the default value(s) (e.g., either the timing or the bundle size, respectively) that were used for a previous transmission, and/or if the WTRU determines that the subframe for which the WTRU could receive downlink control signaling (e.g., n) collides with the occurrence of a measurement gap (e.g., the end of the gap), the WTRU may revert to the default timing and/or bundle size for this process. This may be the case if the values for one or more of x, k, y, and/or TTI_BUNDLE_SIZE are adjusted dynamically for the concerned process according to other methods described herein.

In an example, dynamic adjustments of values for one or more of x, k, y, and/or TTI_BUNDLE_SIZE may not be applied to a HARQ process for the random access procedure. For example, the WTRU may apply the default values for one or more of x, k, y, and/or TTI_BUNDLE_SIZE (or may apply some other static values) for transmission/reception of RACH msg3 following the reception of a grant in a RAR. In this example, the methods for dynamically modifying the HARQ timing values may not be applicable to the reception of HARQ feedback for msg3.

In an example, t dynamic adjustments of values for one or more of x, k, y, and/or TTI_BUNDLE_SIZE may not be applied to a HARQ process associated with a configured grant. For example, the WTRU may apply the default values for one or more of x, k, y, and/or TTI_BUNDLE_SIZE (or may apply some other static values) for transmission/reception configured by semi-persistent scheduling. For example, HARQ processes configured for and/or reserved for SPS may apply the default values for one or more of x, k, y, and/or TTI_BUNDLE_SIZE (or may apply some other static values). In an example, if the SPS grant is not activated, the timing and/or bundling values (e.g., values for one or more of x, k, y, and/or TTI_BUNDLE_SIZE) may be modified for the HARQ process.

In one example, the methods described herein may be applied only to HARQ feedback reception with PHICH and/or to PHICH timing. In another example, the methods described herein may be applied only to HARQ feedback on the PDCCH. For example, if the HARQ process for a WTRU operates with x=k=2, the resulting PHICH resource assignment may be determined from a combination of signaled parameter value(s) and possibly based on a parameter derived from a PUSCH transmission setting(s) in one or more earlier subframe(s). Signaled parameter values may include PHICH group(s), code index value(s), and/or offset values to be applied when deriving the PHICH A/N resource to be monitored in a DL subframe. The parameters may be signaled through RRC signaling messages, or configured in the WTRU as part of the radio link configuration procedures.

In an example, a WTRU operating according to the fast HARQ (e.g., fast HARQ may refer to HARQ operation with non-default values for one or more of x, k, and/or y yielding a RTT that is faster than the default RTT of 8 subframes) may derive a corresponding PHICH resource assignment for a DL subframe n carrying PHICH based on transmission settings chosen for UL subframe n-k carrying PUSCH, for example a starting resource block (RB). In an example, the PHICH resource assignment may be determined by the WTRU as a function of one or more signaled and explicitly configured resource assignment value(s). Two or more PHICH resources may be monitored by a WTRU in a subframe supporting fast HARQ, where a first PHICH index may be determined based on a signaled parameter(s), previous transmission settings, and/or a combination of thereof. A second PHICH resource to be monitored in that same subframe may be determined by the WTRU based on an offset value. The offset value may be determined by the WTRU based on fixed value, it could be derived or obtained from a signaled parameter, and/or it may be determined based on one or more previous transmission settings.

In an example, a collision between PHICH resource assignments in a DL subframe n for a Fast HARQ process and for one or more legacy HARQ process(es) (e.g., default values for x, k, and y) may allow the PHICH resource assignment to be shared between the processes.

In an example, HARQ feedback information may be provided along with an explicit indication of the HARQ process of which the information may pertain. Such an indication may include the HARQ process index itself (e.g., 0-7; 0-15, 0-31, etc., for example if more than 8 HARQ processes may be utilized) and/or of an indication to one of a subset of possible HARQ processes that may collide. For example, if feedback for two HARQ processes may possibly collide, then the feedback for the first HARQ process may be assigned a first index (e.g., 0) and feedback for the second HARQ process may be assigned a second index (e.g., 1). The index may be transmitted with the HARQ feedback. The indication and associated HARQ information may be provided in a downlink control information message (e.g., carried over PDCCH and/or E-PDCCH).

In an example, HARQ feedback information from multiple HARQ processes may be combined into a single indication (e.g., HARQ bundling may be performed). For example, an ACK indication may be provided if the HARQ information for each of the HARQ processes associated with the bundled feedback is an ACK, while a NACK may be provided otherwise. In other words, if the HARQ feedback for any of the bundled processes is a NACK, the WTRU may send a NACK indication, but if the HARQ feedback for each of the bundled processes is an ACK, the WTRU may send an ACK indication.

HARQ feedback information may be provided for a subset of HARQ processes or even a single HARQ process according to a priority rule between the HARQ processes. For example, the WTRU may assume a specific HARQ feedback (e.g., ACK) for the other processes for which the information may not be provided based on feedback for one or more other HARQ process that are provided. The priority rule may be based on one or more of an order between processes that may be pre-defined (e.g., based on index) or provided by higher layers, associated parameters such as the TTI bundle size, n, k, and/or y, the HARQ/TTI bundling parameters configuration, the delay since the initial transmission from each process (e.g., the process which started earlier may have higher priority), and/or the like.

In an example, link coverage may be enhanced by introducing the option of utilizing transmission time intervals (TTIs) that span an interval longer than a single subframe of 1 ms. Such an approach may inherently improve subframe utilization and provide time diversity. As an example, a WTRU configured to operate in a "Coverage Limited Mode" and/or a "Power Limited Mode" may be configured to utilize a longer TTI for some or all transmissions that occur while in the "Coverage Limited Mode" and/or the "Power Limited Mode." The following examples and features related to the enabled use of longer TTIs may be implemented in any combination. Longer TTIs may also be used in combination with other linker coverage improvement techniques described herein. When referred to herein, the terms "long TTI" and "longer TTI" may refer to a TTI that is longer than 1 ms (e.g., either via contiguous or non-contiguous subframes). The term "normal TTI" may refer to a TTI that is a 1 ms in length.

For example, physical layer processing such as encoding and/or interleaving may be modified for transmission using a long TTI. One or more transport blocks may be transmitted in a long TTI. Each transport block may be channel coded using one or more of the following coding steps: cyclic redundancy check (CRC) addition, code block segmentation, CRC attachment, channel coding, rate matching, code block concatenation, multiplexing with control information, and/or channel interleaving.

The set of coded bits transmitted during a long TTI may correspond to one or more of the redundancy versions typically used for a normal TTI. For example, the WTRU may be configured to transmit different redundancy versions of the same encoded transport block(s) (e.g., and the same HARQ process) in different TTIs and/or in a single long TTI. For example, the set of coded bits transmitted during a long TTI may correspond to one or more of a number of possible redundancy versions according to a predetermined rule, WTRU configuration, and/or signaling from the eNB. In another example, the encoding may be such that a single redundancy version is defined. The channel interleaver may be configured such that symbols corresponding to adjacent coded bits may be mapped to resource elements in non-adjacent subframes after the operation of mapping to resource elements. Doing so may enhance time diversity.

In an example, physical layer processing such as scrambling, modulation and resource mapping may be modified for transmission using a longer TTI. Bits for transmission, such as coded and interleaved bits, may be scrambled, modulated to generate symbols, mapped onto at least one transmission layer, transform precoded, precoded, and/or mapped to resource elements. The layer mapping and precoding steps may be such that symbols mapped to resource elements in adjacent subframes are transmitted on different layers and/or different antenna ports after the operation of mapping to resource elements. Doing so may increase diversity. For example, if a first set of bits are mapped to the same resource element(s) in adjacent subframes, the bits transmitted in the first subframe may be transmitted on a first MIMO transmission layer and/or first antenna port and the bits transmitted in the second subframe may be transmitted on a second MIMO layer and/or a second antenna port.

In an example, physical layer processing such as mapping to resource elements and subframes may be modified for transmission using a longer TTI. Upon completion of other physical layer processing, a sequence of symbols may be generated for at least one antenna port. These symbols may be mapped onto resource elements of a number of subframes N, where N may be larger than 1 (e.g., in an example the N subframes may represent the length of the longer TTI). Note that in the following examples for mapping the coded bits to resource elements, one or more resource elements in various subframes may be skipped due to the resource element being reserved for transmission of a reference signal and/or control channel. As may be appreciated, the WTRU may be configured to refrain from using these resource elements when mapping the bits of the transport block(s) to the appropriate resource elements.

The mapping to resource elements with more than one subframe may be such that the symbols are mapped to resource elements by order of subframe timing first, time within a subframe second, and frequency last. For example, the bits may first be assigned to a given subframe, then mapped to resource elements increasing in time across a first subcarrier in (e.g., time-first mapping across OFDM symbols of a subcarrier), then mapped to resource elements increasing in time across a second subcarrier, etc. until allocation in the given subframe has been utilized. Next, a second subframe may be selected, and the remaining bits may be mapped in time-first order across the sub-carriers assigned to the WTRU for the second subframe.

In an example, the mapping may be such that the symbols (e.g., coded bits) are mapped to resource elements by order of time within a subframe first, subframe timing second, and frequency last. For example, the bits may be first mapped to the first resource element of the first subframe of the first subcarrier assigned to the WTRU. Next, the remaining bits may be mapped to the first resource element of the second subframe at the first subcarrier assigned to the WTRU. The remaining bits may then be mapped to the first resource element of the first subcarrier across the remaining subframes assigned to the WTRU. Next, the remaining bits may be mapped to the second resource element of the first subcarrier of the first subframe, followed by the second resource element of the first subcarrier of the second subframe, and so on until each of the resource elements of the first subcarrier have been utilized. The process may then be repeated for the second subcarrier, third subcarrier, etc. until each of the subcarriers have been utilized or the data for transmission has been exhausted.

Depending on the specific channel interleaver design, these resource element mapping methods increase the time diversity of the channel by mapping symbols corresponding to adjacent channel coded bits to resource elements that are further apart in the time domain.

Figure 5:
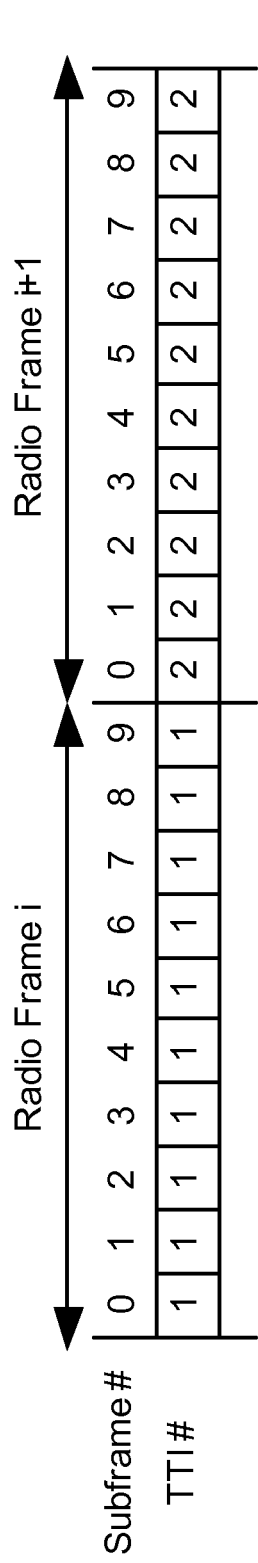
FIG. 5 illustrates an example of a long TTI that includes multiple consecutive subframes.

In an example, the N subframes may be consecutive in the time domain. Utilizing consecutive subframes in the time domain for an extended TTI may minimize the transmission delay of transport block(s) transmitted in the longer TTI. Additionally, by utilizing consecutive subframes in the time domain for a long TTI, each of the subframes onto which a long TTI is mapped may occur before any subframe onto which a subsequent long TTI is mapped. An example of utilizing consecutive subframes in the time domain for a long TTI is illustrated in FIG. 5.

Figure 6:
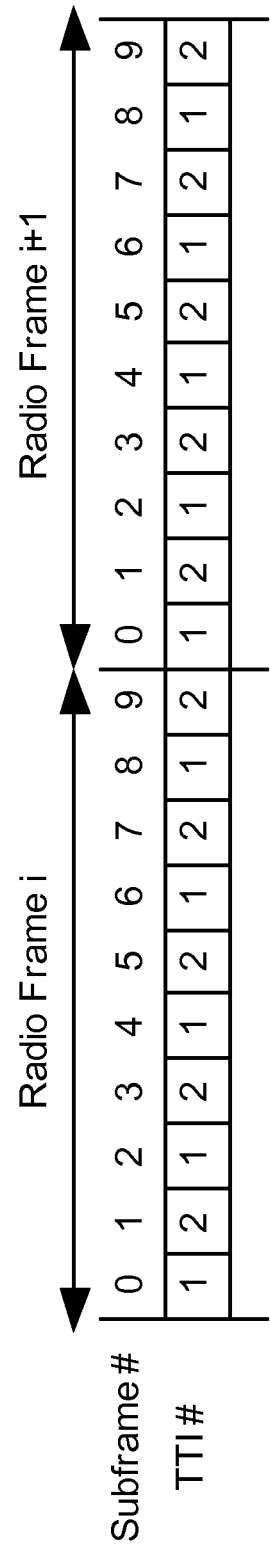
FIG. 6 illustrates an example of a long TTI that includes multiple non-consecutive subframes.

In an example, the N subframes may be a subset of subframes within a set of M subframes, for example according to a pre-determined or signaled pattern. Thus, in this example the subframes associated with a long TTI may be non-consecutive. The number of subframes M may be set such that the transmission delay of a transport block may be maintained within a certain delay requirement. For example, a delay requirement for a VoIP packet may be 40 ms, so M may be selected to be 40. In another example, M may be selected to be less than 40, for example 20 or 10. By distributing the subframes associated with a long TTI among a larger group of subframes, time diversity may be achieved while ensuring that the delay requirement is still met. In an example, it may be possible to interleave the subframes onto which successive TTIs are mapped to ensure continuous (or almost continuous) use of the resource in the time domain. For example, FIG. 6 illustrates a long TTI with distributed subframes (e.g., the subframes are not contiguous in the time domain) where N=10 and M=20.

Figures 7, 8:
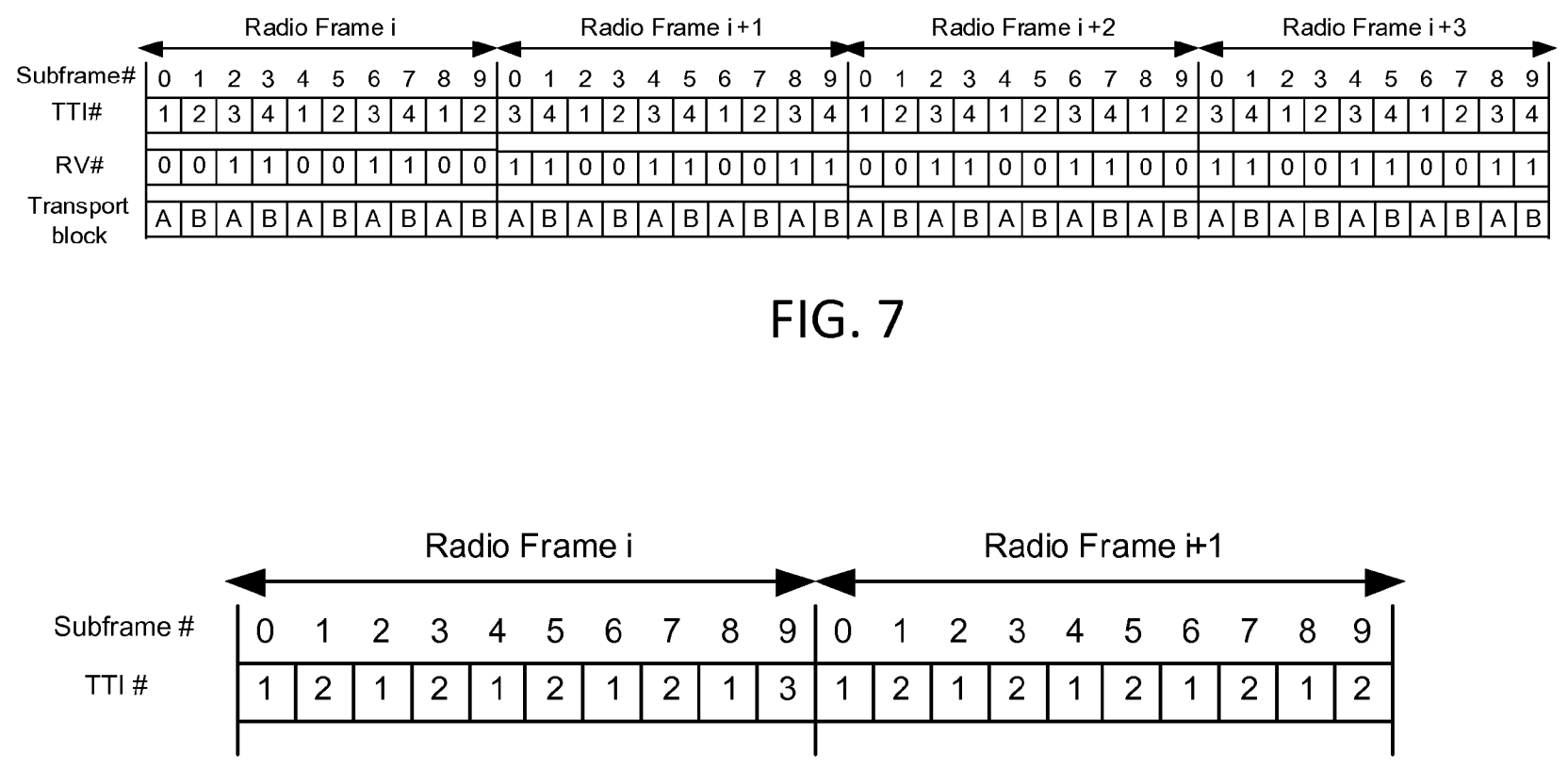

FIG. 7 illustrates another example of possible configuration of a long TTI. For example, as illustrated by FIG. 7, the long TTI may allow for the transmission of two redundancy versions within the long TTI for each transport block. In the example illustrated in FIG. 7, a TTI may be mapped on N=10 subframes over a period of M=40 subframes. A total of 4 TTIs may be transmitted over the 40 ms period. In a first TTI (e.g., TTI#1), a first redundancy version (e.g., RV#0) of a first transport block (e.g., Transport Block A) may be transmitted. In a second TTI (e.g., TTI#2), a first redundancy version (e.g., RV#0) of a second transport block (e.g., Transport Block B) may be transmitted. In a third TTI (e.g., TTI#3), a second redundancy version (e.g., RV#1) of the first transport block (e.g., Transport Block A) may be transmitted. In a fourth TTI (e.g., TTI#4), a second redundancy version (e.g., RV#1) of the second transport block (e.g., Transport Block B) may be transmitted. Thus, the use of the long TTIs interleaved in the time domain may allow for the transmission of multiple redundancy versions of various transport blocks while achieving time diversity and still meeting delay requirements.

In an example, uplink control information (UCI) such as HARQ A/N and/or CSI may be multiplexed with PUSCH on a per-subframe basis. The UCI may be encoded and multiplexed such that symbols are mapped to a known subset of resource elements in a given subframe, resulting in puncturing of PUSCH symbols that would normally be mapped to these resource elements (e.g., UCI, rather than PUSCH data, may be mapped to these resource elements). By doing so, the WTRU may transmit UCI that is decodable on a per-subframe basis even if the PUSCH is transmitted over a long TTI. In an example, the UCI or part of the UCI (such as CSI) may be multiplexed with PUSCH data prior to channel interleaving and mapping to resource elements of PUSCH, such that the UCI may be decodable along with PUSCH.

For example, UCI may be mapped to a predetermined set of symbols in a given timeslot or subframe. In an example, UCI may be mapped to symbols that are adjacent to the modulation symbols that carry pilot signals. In an example, a WTRU may determine a subset of subcarriers for the mapping of UCI and then map the UCI to resource elements in the determined subset of subcarriers. The WTRU may avoid mapping the UCI to resource elements used for the transmission of reference signals.

In an example, the encoding, mapping and/or generation of UCI bits, symbol(s) and/or channel-coded UCI sequences or portions thereof may employ a randomization function to mitigate the impact of intra- and/or inter-cell interference. Without loss of generality, when referred to herein, UCI may correspond to un-coded UCI bits or symbols, to channel-coded sequences derived from the un-code UCI bits or symbols, and/or portions or subsets of channel-coded bits that are relevant for mapping in a given time interval such as a timeslot, subframe and/or TTI (e.g., normal and/or long).

For example, the randomization function may operate on a per-symbol, per-timeslot, per-subframe and/or per-TTI (e.g., long and/or normal) basis. The randomization function may be based on a combination of parameters, for example operating on a combination of a per-symbol, per-timeslot, per-subframe and/or per-TTI basis (e.g., long and/or normal). In an example, the randomization parameters employed by the WTRU may be varied in a random and/or known order in order to generate a sequence of different selected transmission parameters for input to the randomization function.

For example, the randomization function used to generate the mapping of UCI may result in the use of different cyclic shift values, different spreading codes, different input positions to the discrete Fourier transform (DFT) operation or to the inverse fast Fourier transform (IFFT) operation for a signal that includes UCI, and/or different symbol positions within a given transmission for a signal(s) carrying UCI. In an example, the mapping of UCI onto time-/frequency resources for UL transmission may be determined by the WTRU as a function randomization parameters, such as symbol number, timeslot number, subframe number, and/or TTI number (e.g., long and/or normal).

In an example, the WTRU may determine the UL transmission scheme based on a table of stored randomization values. In an example, the WTRU may determine the randomization values as a function of one or more transmission parameters (e.g., symbol number, timeslot number, subframe number, and/or TTI (e.g., long and/or normal) number, etc.). For example, when multiplexing channel-coded ACK/NACK (AN) bits into a timeslot or subframe using a given transmission scheme, the OFDM symbol position for mapping such AN bits may be varied on a per-timeslot and/or per-subframe basis. For example, in a first timeslot or first subframe, a first (set of) AN bit(s) or a channel-coded sequence computed from AN bits may be mapped to symbol positions #2 and #4. In a second timeslot or second subframe, a second (set of) AN bit(s) or a channel-coded sequence computed from AN bits may be mapped to symbol positions #1 and #5. In some scenarios, the first and the second sets of AN bits and/or the first and second sets channel-coded sequences may be the same/identical, for example when the same UCI is repeated in more than one timeslot or subframe. In another example, the first and the second sets of AN bits and/or the first and second sets channel-coded sequences may be different sets of AN bits and/or different sets of channel-coded sequences in the first and second timeslots or subframes.

When multiplexing channel-coded AN bits into a timeslot or subframe, different spreading codes, cyclic shifts, and/or DFT/IFFT encoding parameters may be selected by a WTRU as a function of symbol, timeslot, subframe and/or TTI (e.g., long and/or normal) numbers. For example, in a first symbol, timeslot, subframe, and/or TTI (e.g., long and/or normal), a first (set of) AN bit(s) or a channel-coded sequence computed from AN bits may be encoded using a first spreading code of a given length. In a second symbol, timeslot, subframe, and/or TTI (e.g., long and/or normal), a second (set of) AN bit(s) or a channel-coded sequence computed from AN bits may be encoded using a second spreading code of a given length. The first and the second set of AN bits and/or first and second channel-coded sequences may be the same/identical, for example when the same UCI is repeated in more than one timeslot or subframe. In an example, the first and the second set of AN bits and/or first and second channel-coded sequences may be different sets of AN bits and/or different sets of channel-coded sequences in the first and second symbol, timeslot or subframe.

To enable multiplexing with radio bearers that may have different quality of service (QoS) requirements, the WTRU may utilize both normal-length TTI (e.g., single subframe) and long TTI. For example, normal-length TTIs and long TTIs may be mapped to subframes according to a predetermined or pre-signaled pattern, where the signaling may take place at higher layers (e.g., MAC or RRC). Such pre-defined mapping may result in long TTIs that may be mapped on a varying number of subframes depending on whether a normal-length TTI is to be accommodated. Such an arrangement is illustrated in FIG. 8.

As shown in FIG. 8, sub-frame #9 of radio frame #i may utilized by a normal length (e.g., TTI#3). In this example, a first long TTI (e.g., TTI#2) may be mapped onto a reduced number of subframes than are used for other long TTIs (e.g., 9 subframes instead of 10 subframes). Long TTIs that are not punctured to accommodate the transmission of a normal TTI (e.g., or some other TTI of various length) may utilize the normal number of subframes associated with the long TTI (e.g., 10 subframes in this example). Whether a long TTI is to be punctured to accommodate that transmission of some other TTI (e.g., a normal TTI or a different length long TTI) may be taken into account during the operation of channel coding and multiplexing, since it may be known in advance that punctured TTI will be mapped on a smaller number of resource elements.

In an example, normal-length TTIs and long TTIs may be mapped to subframes according to a pattern that may be undetermined or unknown at the time the data to be transmitted over a long TTI is processed. For example, such a situation may occur if a high-priority bearer is to be scheduled. In this example, the WTRU may determine at subframe n that data for a high-priority bearer is to be scheduled at subframe n+m (e.g., where m may be 2 or 4), for example based on the reception of a dynamic grant from a downlink control channel. The WTRU may use a portion and/or all of the resource elements of a subframe that would normally be used for PUSCH transmission of data for the long TTI to transmit PUSCH data for the normal TTI instead (e.g., data scheduled by the recently received dynamic grant). Successful reception of the data from the long TTI may still be possible at the receiver considering the use of channel coding and interleaving and/or transmission of multiple redundancy versions.

In an example, normal-length TTIs and long TTIs may be mapped to the same subframe for certain subframes, but occupy different sets of resource elements (e.g., in adjacent frequencies to avoid non-linearities). Whether to map both a normal TTI and a long TTI to the same subframe may be indicated in a grant from a downlink control channel or from higher layers. Channel coding, interleaving, and subsequent physical layer processing make take place independently for the data to be transmitted on each TTI.

One of the features of LTE as compared to previous radio access technologies is that a WTRU may have a reduced number of UL subframes (e.g., as compared with number of subframes available using previous radio access techniques) to utilize in order to successfully deliver a given TB (e.g., VoIP packet, segment of a VoIP packet, etc.) during an allowed transfer time interval. As a result, a WTRU could suffer from UL coverage problems if radio problems persist during the shortened subframe window use for a UL transmission. Similarly, with each new VoIP packet or segment of a VoIP packet typically arriving every 20 ms, the UL subframe utilization ratio with existing LTE radio technology may be less than 100%. In other words, every UL subframe may not be used by the WTRU in typical LTE deployments. However, despite the less than complete usage, multiple concurrent UL HARQ processes may be active during the allowed UL transfer delay of 50 ms for each packet. In an example, dedicated PUSCH allocations to a WTRU may be utilized in order to improve LTE UL coverage. Dedicated PUSCH allocations may refer to allocations of the PUSCH that repeat over time and/or occur in pre-specified times, frequencies, and/or locations. For example, a dedicated PUSCH allocation may allocate certain resources to the WTRU in every UL subframe for the life of the allocation (e.g., may be until the allocation is revoked). The eNB may reserve the future transmission resources for the dedicated PUSCH allocation.

By using dedicated PUSCH allocations, a WTRU may be able to create/receive PUSCH allocations that possess an inherently higher transmission density (e.g., more frequent transmission opportunities in time domain) than are supported by the existing LTE n+8 UL HARQ re-transmission delays (e.g., even in presence or absence of TTI bundling). For example, the UL receiver (e.g., the eNB) may collect significantly more energy for successfully decoding a TB during the allowed transfer time interval when dedicated PUSCH allocations are utilized than what is possible by using existing LTE radio access procedures. This may facilitate successful decoding in time limited scenarios, for example when a given TB may correspond to a VoIP packet including overhead and/or segments of such a packet.

Operation of dedicated PUSCH allocations may be implemented together with a dynamic grant mechanism and/or with Semi-Persistent allocations in LTE. Dedicated PUSCH allocations may be utilized in the presence and/or the absence of HARQ feedback. In an example, operation of Dedicated PUSCH may be combined with early termination options signaled from the UL receiver (e.g., eNB). For example, the Dedicated PUSCH allocation may be active from the time of allocation until it is terminated by the eNB. It is noted that although some transmission benefits may be achieved for HARQ operation by matching the instantaneous transmit power to channel conditions, dedicated PUSCH channels may operate in a more effective than manner than traditional UL HARQ under certain coverage conditions, for example especially in coverage-limited scenarios. In fact, for a WTRU in coverage limited scenarios, an eNB may monitor WTRU performance indicators such as reported pathloss, available transmit power, and/or available power headroom and configure a WTRU for use with Dedicated Channels if a coverage limited scenario is detected.

Figure 9:
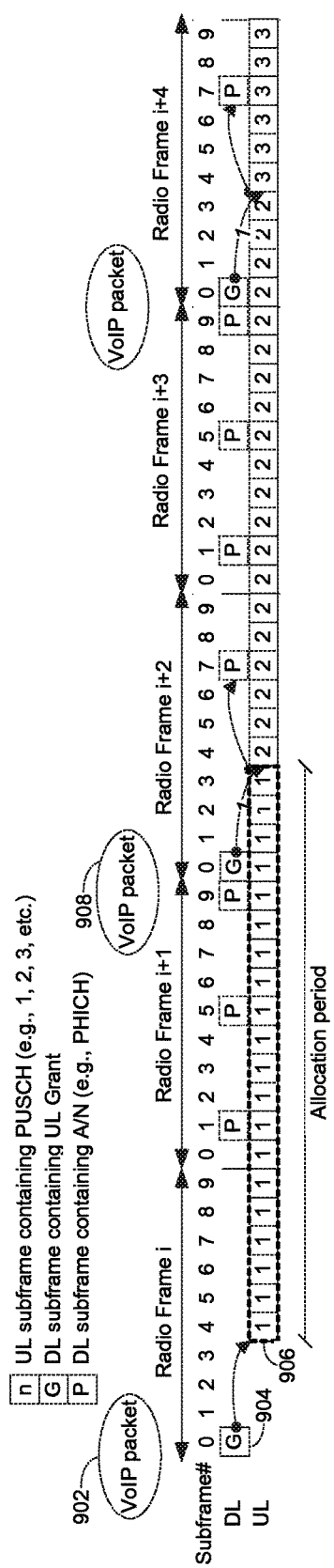
FIG. 9 illustrates an example of operation in accordance with a dedicated PUSCH allocation for every subframe.

For example, a dynamic UL grant received in subframe n1 may allocate a Dedicated PUSCH with starting subframe n2 for an allocation period of m1 subframes with an allocation recurrence of m2 subframes. Thus, the grant may be received in subframe n1, the WTRU may begin using the dedicated PUSCH resources in subframe n2, and the allocation may last for m1 subframes and recur every m2 subframes. An example of operation in accordance with an allocation of a dedicated PUSCH is illustrated in FIG. 9. Following the arrival of a first higher-layer PDU prior to or near the beginning of frame i (e.g., VoIP Packet 902), the WTRU may receive an UL grant 904 in frame i/subframe 0. For example, the allocation may indicate one or more of the starting subframe (e.g., n2) and/or the starting subframe may be determined inherently based on the timing of the grant (e.g., allocation begins a predetermined or configured number of subframes later). The Dedicated PUSCH grant may indicate the length of the allocation period (e.g., m1) and/or the period at which the allocation is repeated (e.g., m2). For example, according to the Dedicated PUSCH allocation included in Grant 904, the WTRU may transmit a PUSCH for an allocation period of m1=20 subframes with an allocation recurrence of m2=1 subframes (e.g., every subframe). Thus, PUSCH transmission 906 may correspond to the Dedicated allocation, for example beginning in frame i/subframe 4 and ending in frame i+2/subframe 3. Following the reception of a second higher layer PDU prior to or near the beginning of frame i+2 (e.g., VoIP Packet 908), the WTRU may receive a subsequent UL grant resulting in another Dedicated PUSCH allocation, for starting in frame i+2/subframe 4. The process may be repeated as desired. The parameters associated with the Dedicated PUSCH allocation (e.g., allocation period m1, allocation repetition period m2, etc.) may change among the allocations.

As may be seen from the example in FIG. 9, the proposed Dedicated PUSCH allocations may allow a WTRU to transmit each single arriving VoIP packet using every subframe for duration of some 20 ms at full UL subframe utilization. Therefore, some 20 TTIs may be collected by the receiver to successfully decode a TB using the proposed transmission approach. Using existing LTE radio access procedures, up to 7 TTIs may be collected by the receiver in absence of TTI bundling, and some 12 TTIs may typically be collected using TTI bundling size 4 with 50 ms transfer delays. Thus, for some scenarios, the use of dedicated PUSCH allocations may increase the energy that the receiver may collect by 2.2 dB compared to the use of TTI bundling. It is noted that the transfer of each TB (e.g., VoIP packet or segment) may take 20 ms using the Dedicated PUSCH allocation. This itself may result in an improvement in perceived voice quality (e.g., typical RAN delays in current deployments may be up to 50 ms). The faster transmission time may allow for inherently more flexibility using higher layer retransmission protocols if desired (e.g., although existing LTE may utilize RLC unacknowledged mode (UM)).

Figure 10:
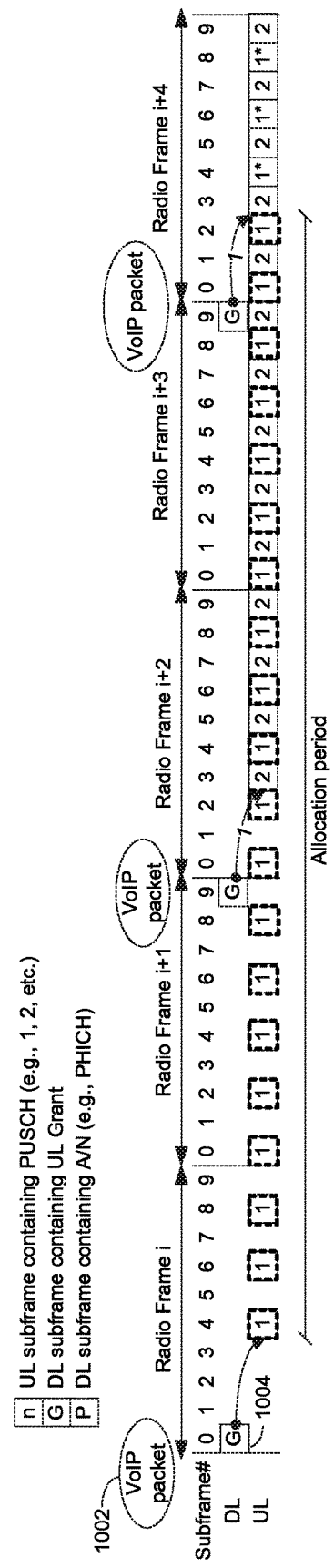
FIG. 10 illustrates an example of operation in accordance with a dedicated PUSCH allocation for every other subframe.

Another example of Dedicated PUSCH allocations is illustrated in FIG. 10. Following the arrival of a first higher-layer PDU prior to or near the beginning of frame i (e.g., VoIP packet 1002), the WTRU may receive UL Grant 1004 in frame i/subframe 0. In this example, the allocation period m1 may be set to 40 subframes and the allocation recurrence period m2 may be 2 subframes. Thus, for this example Dedicated PUSCH allocation may take 40 subframes or 40 ms to complete, and the WTRU may transmit using the Dedicated PUSCH allocation ever other subframe. PUSCH Transmission 1006 (e.g., indicated by the #1 inside a dashed box in FIG. 10) may illustrate a PUSCH transmission that is in accordance with the Dedicated PUSCH allocation indicated by UL Grant 1004. Following the reception of a second higher layer PDU prior to or near the beginning of frame i+2, the WTRU may receive a subsequent UL grant resulting in another Dedicated PUSCH allocation starting in frame i+2/subframe 3 (labeled #2 in FIG. 10). Upon arrival of a third higher-layer PDU prior to or near the beginning of frame i+4, the first Dedicated PUSCH may have completed, and the corresponding UL subframe may become available for transfer of the TB corresponding to this latest incoming PDU. These subframes may be labeled 1* in FIG. 10.

As can be seen from the example in FIG. 10, the proposed Dedicated PUSCH allocations may allow a WTRU to transmit each arriving VoIP packet using every other subframe for a duration of some 40 ms at half UL subframe utilization per TB. Therefore, approximately 20 TTIs may be collected by the receiver to successfully decode a TB using the proposed transmission approach. Therefore, a similar improvement relative to the case of no bundling or TTI bundling using existing LTE radio access procedures can be expected for the example in FIG. 10 as was achieved for the example in FIG. 9. It is noted that the example in FIG. 10 may allow for time diversity in the order of 40 ms during the lifetime of any given TB being transmitted. Therefore, the receiver (e.g., eNB) may collect more energy to successfully decode each packet, and the time diversity inherent to the Dedicated PUSCH allocation with a recurrence period of 2 subframes may typically result in an additional performance benefit of some 1-2 dB in presence of many fading channels.

It is noted that operation of Dedicated PUSCH allocations may be combined with transmission modes such as Frequency Hopping. For example, frequency hopping may be performed on a per-subframe, per timeslot, and/or some combined basis. Therefore, the dedicated physical resources utilized for the Dedicated PUSCH allocation may hop in the frequency domain according to the configured or predefined hopping pattern.

As may be appreciated from the illustrative examples in FIG. 9 and FIG. 10, one distinguishing characteristic of a Dedicated PUSCH allocation may be that the corresponding PUSCH transmission opportunities may be allocated at much higher density in time-domain than existing LTE transmission procedures for any given TB. For example, using existing LTE procedures any initial UL transmission may be re-transmitted every 8 subframes in case of no TTI bundling and/or every 16 subframes using TTI bundling. As a result, the eNB may have a higher probability of successfully decoding a given packet.

The configuration of the Dedicated PUSCH allocation period m1 and/or the Dedicated PUSCH recurrence period m2 may be established using various criteria. For example, fixed length allocation periods of limited duration in terms of number of subframes and/or frames may be used. As an example, the UL grant for the Dedicated PUSCH allocation may indicate the number of subframes that correspond to the Dedication PUSCH allocation period (e.g., m1). If no allocation period is provided, a predetermined allocation period may be used and/or the allocation period may be assumed to be infinite or until the dedication PUSCH allocation is revoked by the eNB. In an example, subframe and/or frame allocation patterns defining which subframes and/or frames a WTRU may be provided with a PUSCH transmission opportunity may be specified or predefined. For example, the UL grant for the Dedicated PUSCH allocation may indicate a recurrence period (e.g., m2) and/or recurrence pattern. The Dedicated PUSCH allocation may also indicate the identity of the physical resources (e.g., in the time and/or frequency) domain to be used for the Dedicated PUSCH allocation. For example, the grant may indicate the set of physical resources to use in the first subframe of the Dedicated allocation, and the WTRU may determine the appropriate dedicate resources in subsequent subframes based on the allocation period and/or allocation recurrence period. Resulting allocations of PUSCH transmission opportunities may be explicitly signaled through parameters such as RRC. In an example, allowable PUSCH transmission opportunities may be stored in a table or equivalent where an allocation message may include an indication of an entry or index corresponding to one or more Dedicated PUSCH allocation in the table.

Dedicated PUSCH allocations may be utilized in conjunction with existing LTE resource allocation principles (e.g., using the dynamic grant based mechanism and using SPS allocation). For example, as shown in FIG. 9 and FIG. 10, UL Grant 904 and/or UL Grant 1004 may be received in DL frame i/subframe 0, may include DCI that corresponds to a dynamic UL grant, and/or may correspond to an SPS activation command. It is noted that existing LTE SPS allocation durations may not currently allow for allocations recurring more often than every 10 subframes. In consequence, one technical realization of Dedicated PUSCH allocation may be to extend parts of the existing SPS configuration information to allow for scheduling intervals less than every 10 subframes. Similarly, given that both DL and UL SPS in existing LTE radio procedures may be utilized quite interactively (e.g., initial TBs are typically scheduled through SPS, but re-transmissions may be explicitly scheduled using dynamic grants), dedicated PUSCH allocations may allow for the use of these mechanisms.

In an example, a HARQ Early Termination protocol may be used when transmitting according to LTE UL channel allocations. Using the example of FIG. 9, a WTRU may be allocated UL subframes according to a Dedicated PUSCH allocation period m1=20 subframes and with a recurrence period of m2=1 subframes. During the process of UL transmission, the WTRU may monitor one or more DL subframes for occurrence of an Early Termination signal sent by the eNB. For example, the WTRU may monitor a PHICH and/or PDCCH for an indication that the eNB has successfully decoded the UL transmission. In FIG. 9, PHICH ACK 910 (e.g., received by the UE in frame i+1/subframe 9) may indicate that the eNB has successfully decoded PUSCH transmission 906, for example based on the portions of PUSCH transmission 906 from subframe frame i/subframe 4 to frame i+1/subframe 5 (e.g., from the initial transmission until the subframe in which the ACK was received min k). The eNB may transmit the early termination signal in a subframe in which the WTRU is expecting HARQ feedback after the eNB has successfully decoded the Dedicate PUSCH transmission.

Following the reception of the Early Termination Signal the WTRU may stop UL transmissions corresponding to the dedicated PUSCH allocation. For example, if the early termination signal is received in subframe n, then the WTRU may stop UL transmission corresponding to the dedicated PUSCH allocation in and/or by subframe n+k. In an example, the WTRU may start transmitting parts of another TB and/or PDU in the transmission opportunities that were allocated but unused due to the reception of the Early Termination Signal.

For example, the monitoring by the WTRU of an Early Termination signal may be defined in terms of subframe numbers and/or as a function UL transmission activity. For example, in order to avoid PHICH collisions with concurrent PHICH transmissions in the same DL subframe by legacy WTRUs, a PHICH carrying the Early Termination ACK for a WTRU supporting Dedicated PUSCH may be placed onto DL subframes in correspondence with the n+8 synchronous HARQ retransmission intervals for existing LTE radio access (e.g., a WTRU transmitting according to a dedicated PUSCH allocation may monitor a PHICH in DL subframe n+4, where n corresponds to a first PUSCH transmission opportunity for the Dedicated PUSCH allocation).

By using the Early Termination signal, the system may still capitalize on some HARQ gains. For example, the interference that may be created in the UL by the WTRU transmissions that occur after the eNB has successfully decoded the information to be transmitted in the Dedicated PUSCH allocation may be avoided. Additionally, the system may statistically benefit as a whole due to a corresponding reduction in noise rise that may be created by WTRU operation. It is noted that the principle of Dedicated PUSCH allocations may combined with any other techniques or methods described herein.

Referring back to FIG. 9, a higher-layer PDU received at the beginning of frame may be channel-coded, interleaved, and/or mapped to physical transmission resources across multiple subframes, for example across the entire number of subframes corresponding to a Dedicated PUSCH allocation. Referring to FIG. 10, a higher-layer PDU may be channel-coded and/or interleaved across some or all subframes given in the m1=40 subframe allocation period (e.g., every other subframe for the m2=2 example that is illustrated). In an example, portions of and/or an entire first PDU may be channel-coded and mapped together into TTI(s) or subframe(s) together with portions of and/or an entire second PDU. In an example, TTIs corresponding to Dedicated PUSCH allocations may be used by the WTRU according to a series of given transmission sequences. For example, redundancy version (RV) sequences may be utilized when maintaining the principle of per-TTI processing per-subframe in existing LTE radio procedures. Similarly, a Dedicated PUSCH allocation may be combined with the Fast HARQ and/or operated with existing HARQ and allocation timelines.

In an example, Dedicated PUSCH allocations may be processed by a WTRU and the actual contents of any given PUSCH transmission opportunity may be determined by the WTRU as a function of transmission status and/or indicated as part of the signaling format to the receiver (e.g., eNB). For example, the WTRU may monitor DL subframes for occurrences of Dedicated PUSCH allocations. The dedicated PUSCH allocations may be explicitly signaled and/or may be configured using RRC and activated through DCI. When the Dedicated PUSCH allocation begins after receiving the grant, for example with parameters m1=320 ms, m2=2, the WTRU may map bits corresponding to the PDU received prior to allocation to the resources associated with the Dedicated PUSCH allocation. The WTRU may continue to transmit channel coded bits for this PDU one the resources associated with the dedicated PUSCH allocation until one or more of a next PDU arrives in the transmission buffer, a pre-determined duration has elapsed (e.g., the end of the allocation period is reached), and/or until an early termination signal is received. Following the occurrence of one or more of these events, the WTRU may temporarily cease transmitting in the allocated dedicated PUSCH transmission opportunities (e.g., while these transmission opportunities remain allocated). In an example, rather than allowing the dedicated PUSCH resources go unused, the WTRU may begin sending and mapping channel coded bits corresponding to a second PDU into the remaining resources associated with the previously allocated dedicated PUSCH allocation. A signaling format indicator, which may be a portion of one and/or several UL transmission opportunities in the dedicated PUSCH allocation, may be used to distinguish or indicate to the receiver (e.g., eNB) which PDU or parts thereof the WTRU is sending. In an example, the signaling format indicator may be encoded as part of the UL PUSCH transmission and/or may be encoded/transmitted as part of a separate signal in one or more subframes. In an example, a preamble or signature may be sent to the eNB to indicate the new commencing transmission interval or TB within the allocated dedicated PUSCH transmission opportunities.

In an example, the UL link performance may be improved by enhancing the design of uplink reference signals for small payloads. For example, in the case of relatively small user data payloads (e.g., VoIP packets or segments thereof) the proportion of energy that should be allocated to reference signals and/or data symbols may be different than the proportion that may be allocated for packets of varying or average size. For example, depending on the receiver capabilities and other factors, it may be more efficient to allocate more energy to reference signals in the case of small payloads than is allocated to reference signals associated with larger payloads. The increase in the amount of energy allocated to UL reference signals may facilitate more effective channel estimation and/or decoding at the UL receiver (e.g., eNB).

For example, additional resource elements within a PUSCH transmission than are typically used for reference signals may be utilized for the transmission of reference signals in some scenarios. As an example, if less than all of the resource elements allocated to a WTRU for UL transmission are used for the transmission of UL user data (e.g., the amount of user data to be transmitted is less than the size of an allocated grant), resource elements within the allocation that would typically be used for user data transmission be instead be used for reference signal transmission. The resource elements used for reference signal transmission may not be available for the transmission of PUSCH data. For example, the resource elements used for additional reference signal transmission may be located in OFDM symbols that are different that the OFDM symbols used for the transmission of demodulation reference signals (DM-RSs) in existing transmission schemes. The additional reference signal that are transmitted in resource elements that are typically used for PUSCH data transmission may have a similar or the same structure as the DM-RSs, for example where the signal value may depend on one or more of the position of the RE in the resource grid, the number of resource elements per OFDM time symbol, and/or the number of resource blocks in the allocation. A new transmission structure may be defined based one or more of these parameters.

In an example, some of the resource elements currently used for the transmission of reference signals may be used for transmission of PUSCH data symbols. Such resource elements may not be available for the transmission of DM-RSs. In this example, the DM-RS signal may be generated the resource elements used for transmission of the DM-RSs may be determined based on one or more of the total number of resource elements, subcarriers, and/or OFDM symbols associated with the allocation, the identity of resource elements, subcarriers, and/or OFDM symbols associated with the allocation, and/or the total number of resource elements, subcarriers, and/or OFDM symbols in the allocation that are used to transmit user data (e.g., if less than all of the PUSCH resources allocated to the WTRU need to be used to transmit the data). In an example, the current resource elements (e.g., Release 8 or Release 10 LTE) that are used for DM-RS transmission in the UL may still be used for DM-RS transmission, but additional resource elements that are typically used in Release 8 or 10 for PUSCH data may also include additional DM-RSs.

In an example, a pilot signal, training sequence, and/or reference signal may be transmitted together with a channel-coded data sequence on all or a subset of OFDM symbols in a timeslot. The channel-coded data sequence may include user data and/or control information (e.g., UCI). The channel-coded data sequence may correspond to all or a subset of channel-coded bits determined from channel-coding a transport block that is to be mapped to a timeslot, subframe, and/or TTI.

Figure 11:
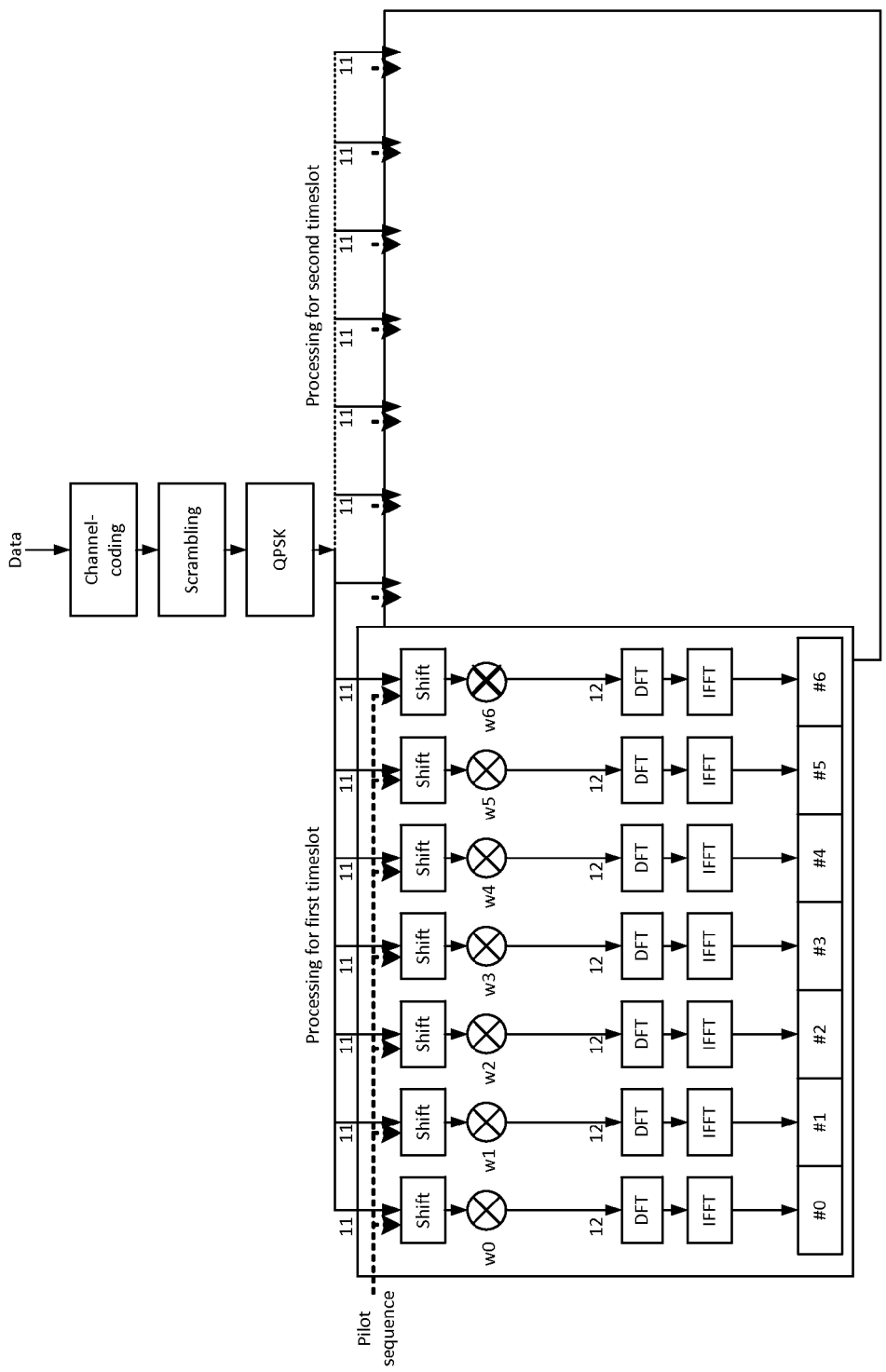
FIG. 11 illustrates an example implementation for transmitting a pilot sequence together with a channel-coded data sequence.

For example, for a given resource block (e.g., 12 subcarriers) the input to the DFT spreader for a timeslot including 7 OFDM symbols for PUSCH data transmission may be used to configure 11 channel-coded data REs per OFDM symbol and 1 pilot RE per OFDM symbol. Using normal cyclic prefix symbols, at 7 OFDM symbols available per timeslot there may be 11*7=77 REs that correspond to channel-coded data sequence(s) or a subset(s) thereof in a given timeslot. Using normal cyclic prefix symbols, at 7 OFDM symbols available per timeslot there may be 7 REs that correspond to pilot sequence(s) that, for example that may be used for channel estimation. FIG. 11 illustrates an example implementation for transmitting a pilot sequence together with a channel-coded data sequence.

As may be appreciated, different configurations for mapping data REs (e.g., where D may be the number of data REs) and pilot REs (e.g., where P may be the number of pilot REs) onto a number of available OFDM symbols (e.g., where O may by the number of available OFDM symbols) in a given timeslot, subframe, and/or TTI are possible. For example, the P pilot REs may be mapped to a subset of 4 OFDM symbols in a timeslot that includes 7 OFDM symbols using normal cyclic prefix. In an example, the number of data REs (e.g., $D_1$), and/or the number of pilot REs (e.g., $P_1$) in a first OFDM symbol of a timeslot, subframe, and/or TTI may be different than the number of data REs (e.g., $D_2$) and/or the number of pilot REs (e.g., $P_2$) in a second OFDM symbol of the timeslot, subframe, and/or TTI. For example, a first OFDM symbol of a timeslot, subframe, and/or TTI may include 10 data REs (e.g., $D_1=10$) and 2 pilot REs (e.g., $P_1=2$). A second OFDM symbol of the timeslot, subframe, and/or TTI may include 11 data REs (e.g., $D_2=11$) and 1 pilot REs (e.g., $P_2=1$).

Embodiments contemplate transmitting pilot sequences described herein in conjunction with the existing reference signals and/or in the absence of legacy reference signals. For example, embodiments contemplate transmitting pilot sequences in a PUSCH transmission wherein the middle/center OFDM symbol includes a reference signal. In an example, embodiments contemplate transmitting pilot sequences in transmissions wherein 2 OFDM symbols in a slot include reference signals, for example as is the case for PUCCH Format 3. The two reference signals may be in the same position or different positions as is the case for PUCCH Format 3. In an example, the pilot sequences may be selected as an extension of existing pilot sequences, and/or they may be independently derived. Several different approaches are contemplated regarding how to multiplex the interleaved and/or interlaced pilot sequence with a channel coded data sequence. For example, the pilot sequence may be interlaced and/or interleaved together with the channel coded data sequence as part of the shift randomization. Such an approach may result in the reuse of the randomization function. In an example, the pilot sequence may be interleaved and/or interlaced together with the channel coded data sequence prior to the DFT operation or the IFFT operation. In an example, the same randomization function may be applied to the pilot sequence as is applied the channel-coded data sequence. In another example, a different randomization function may be applied to the pilot sequence than is applied the channel-coded data sequence. In an example, the randomization function may be applied to one of the pilot sequence or the channel coded data sequence, but not both.

Interleaving and/or interlacing the pilot sequence with a channel coded data sequence as opposed an approach wherein pilot REs are included in fixed positions within a single and/or two OFDM symbols may allow the channel estimation gains to be more uniformly distributed across the timeslot. Such an approach may be useful when frequency-hopping (e.g., Frequency Hopping type 1 and/or type 2) is employed. Moreover, interleaving and/or interlacing the pilot sequence with a channel coded data sequence may add flexibility to configure the portion of "transmission energy" dedicated to pilot REs versus data REs. Interleaving and/or interlacing the pilot sequence with a channel coded data sequence may remove the orthogonality between different WTRUs transmitting on the same RB. However, removing the orthogonality between different WTRUs transmitting on the same RB may be acceptable in particular in coverage limited scenarios, for example where SNR gains for a single WTRU may be more important in order to achieve better system performance. In cases where maintaining some degree of WTRU multiplexing is desirable, some pilot sequences may be interleaved with the channel coded data sequences in order to distribute the pilot symbols across the timeslot, while other pilot sequences in the timeslot may be mapped to specified REs so that their transmission may remain orthogonal to pilot signal transmissions from other WTRUs that also use those time-frequency resources (e.g., the REs reserved for pilot signal transmission) for transmission of a pilot sequence. For example, the WTRU may be configured to continue to transmit legacy pilot carrying OFDM symbol(s) at the REs indicated by the specifications defined for LTE Release 8 or Release 10, while additionally transmitting pilot sequences that are interleaved and/or interlaced with a channel coded data sequence to be transmitted on the other REs of the timeslot.

In an example, different spreading codes may be used by a WTRU to encode and/or transmit sequences based on whether the sequence includes one or more pilot sequences. For example, a first spreading code may be used for a first sequence of REs, where the first sequence of REs includes a pilot signal or data signal and a pilot signal (e.g., interleaved prior to mapping or the pilot mapped to specific RE(s)). The WTRU may then use a second spreading code to encode and/or transmit a second sequence of channel-coded data REs (e.g., a sequence that does not include pilot sequences) onto one or more RBs. Thus, a first spreading sequence may be employed to map a first sequence that includes a pilot signal to a first set or subset of OFDM symbols occupying a given time-frequency transmission resource, for example a timeslot occupying one RB. A second spreading sequence may be employed to map a second sequence of channel-coded data bits to a second set or subset of OFDM symbols for the time-/frequency transmission resource.

For example, a channel coded data sequence may be mapped to 5 information carrying OFDM symbols in a timeslot using a normal cyclic prefix using a first spreading code of length 5. A pilot sequence may be mapped to the same 5 OFDM symbols in a timeslot but using a second, orthogonal spreading code of length 5.

As may be appreciated, the mode of operation may vary for the case where different lengths of spreading codes are utilized as compared to utilizing different mappings to information carrying OFDM symbols. For example, different subsets or lengths of data and/or pilot signals may be used. Additionally, the approaches described herein may be equally applicable to different cyclic prefix configurations. For example, the techniques disclosed may be applied in situations wherein the extended cyclic prefix is utilized.

LTE UL link coverage may be enhanced by introducing the possibility of utilizing a more power-efficient type of modulation compared to single-carrier FDMA (SC-FDMA). For example, a new modulation may be applied to a subset or within a portion of a UL carrier (e.g., part of the UL carrier may still be used for SC-FDMA transmission while the remaining bandwidth may be used for transmissions utilizing the new modulation). The use of a modulation that results in waveforms with lower peak-to-average ratio (PAPR) or lower cubic metric (CM) may allow the WTRU to operate at higher transmission power without exceeding limits of out-of-band emissions and/or without causing other spurious emissions resulting from non-linearities. For example, a constant-modulus modulation such as Gaussian minimum-shift keying (GMSK) may be utilized, possibly allowing the use of a power-efficient (class C) power amplifier. In an example, interleaved frequency division multiple access (IFDMA) may be used.

The use of a different uplink modulation may be enabled by designing a sharing mechanism between the time and frequency resources occupied by signals generated using the power-efficient modulation, and signals generated using the normal SC-FDMA type of modulation for LTE uplink (e.g., possibly from other WTRUs). For example, transmissions modulated using SC-FDMA and transmissions not using SC-FDMA may be multiplexed in the time domain, in the frequency domain, and/or in the time and frequency domains.

Typically, uplink grants are provided to the WTRU using dynamic scheduling on the PDCCH or are configured via SPS. The uplink grants usually allocate resource blocks that include a plurality of resource elements to be used for the UL transmission. However, if a given UL transmission is to use a modulation other than SC-FDMA, the time-frequency resources associated with the UL grant may instead be used for the transmission using the power-efficient modulation. Although such a transmission may be performed using the time-frequency resources associated with the allocated resource block, the data may not be mapped to resource elements in the manner as would be performed for an SC-FDMA transmission. Thus, the same frequency resources may be multiplexed between SC-FDMA transmission and non-SC-FDMA transmissions in the time domain.

To facilitate sharing in the frequency domain within the same band, the signal modulated according to the new scheme may be pulse shaped and filtered (e.g., using baseband, IF and/or RF filters) in order to limit interference to the rest of the UL carrier within a reasonable level. Guard bands may also be reserved for the same purpose. For example, a WTRU configured to operate using the power-efficient modulation may be allocated a frequency region that is relatively large compared to the spectrum occupancy of the transmitted signal. For instance, the WTRU may be allocated 2 resource blocks for transmission (e.g., 360 kHz) even if the nominal bandwidth of the signal from the power-efficient modulation is less than 200 kHz. Such frequency allocation may be dynamic on a per-subframe basis, semi-persistent, and/or provided by higher layers (e.g., MAC, RRC, etc.). In an example, the WTRU may be configured to change the physical resource block allocation between two slots of the same sub-frame, possibly using the virtual resource block allocation mechanism.

In addition, the use of a second uplink modulation scheme, such as a power-efficient modulation, may be allowed in certain subframes but not allowed in other subframes. For example, whether the use of the power-efficient modulation is allowable in a given subframe may depend on the timing and/or type of subframe (e.g., based on a configuration provided by higher layers). Whether the use of the power-efficient modulation is allowable in a given subframe may also be signaled on a per-subframe basis using a dynamic grant received from a downlink control channel.

Data transmitted using the power-efficient modulation may undergo different physical layer processing steps from other data. For example, a longer or shorter TTI may be used. If GMSK modulation is used, physical layer processing similar to that of voice for GSM may be utilized. It may be possible to transmit data from certain radio bearers using the normal physical layer processing and TTI, while data from other bearers may be transmitted using the second (e.g., power-efficient) modulation. Such co-existence may be more easily achievable if the two types of modulations are not used simultaneously or nearly so (e.g., in same subframe).

In an example, a WTRU may support more than one transmission scheme, for example when operating in a coverage extended mode. The initiation and/or configuration of coverage extended mode may be based on measurements by the WTRU and/or network nodes (e.g., eNB). In an example, the activation and/or use of a particular transmission scheme of a plurality of transmission schemes associated with coverage extended mode may depend on fast changing and/or adjustable transmission settings.

For example, a given transmission scheme may be characterized by factors such as the number of pilots symbols per timeslot, per subframe, and/or per-TTI, the location of pilots or pilot signals with OFDM symbols, the type of modulation, and/or the use of different spreading codes and/or spreading factors such as orthogonal cover code (OCC). The WTRU may determine an appropriate transmission scheme for a given transmission based on a variety of factors as is described below.

For example, a WTRU and/or eNB may dynamically and/or semi-statically determine the transmission scheme (e.g., the appropriate number and identity of resource elements; the appropriate number and identity of OFDM time symbols the appropriate modulation scheme, etc.) for reference and/or data signals that are part of the transmission based on one or more of the following factors in any combination. For example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the size of the allocation (e.g., in number of resource blocks). For example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the position of the allocation in the frequency domain, as possibly indicated by the starting resource block. For example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the type of UCI and/or CSI to be transmitted in the slot, subframe and/or TTI (e.g., No UCI, No CSI, No UCI and no CSI, HARQ only, CSI only, HARQ and CSI, and/or the like).

In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the size of the transport block(s) transmitted in the subframe or TTI. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the size of the TTI (e.g., in number of subframes). In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the size of a TTI bundle or subframe bundle. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the presence or absence of HARQ control information, for example including based on aspects such as the applicable round trip delay for the transmission. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on the power headroom, and/or transmission power. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on an explicit indication provided in downlink control information received from a downlink control channel. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on a frequency hopping mode or configuration thereof. In an example, a WTRU may determine the transmission scheme (e.g., the appropriate number and identity of resource elements; the appropriate number and identity of OFDM time symbols the appropriate modulation scheme, etc.) for reference and/or data signals that are part of the transmission based on an indication from higher layers signaling (e.g., MAC or RRC), possibly as part or along with a receiver capability.

For example, a first transmission scheme using a single pilot symbol per timeslot may be appropriate for a given frequency-hopping mode where transmission in the first timeslot and transmission in the second timeslot use the same frequency resource (e.g., intra-subframe frequency hopping is not utilized). However, a second transmission scheme using 2 pilots per timeslot may be utilized in the case where intra- and/or inter-subframe frequency-hopping (e.g., the transmission during the second timeslot may use a different RB than the transmission in the first timeslot) are utilized, and channel estimation gains from availability of more pilot carrying symbols in a timeslot are available. In an example, a first transmission scheme may employ a different spreading code than a second transmission scheme. For example, the first transmission scheme may use an OCC length of 6, while the second transmission scheme may use an OCC length of 5. By utilizing different spreading codes, channel coding and spreading gains may be increased.

For example, a WTRU may be configured to operate in coverage extended mode based on the reception of a message received from a network node (e.g., eNB). The network node may determine to configure a WTRU in coverage extended mode based on measurements and/or metrics such as path-loss, available transmission power, and/or the like. The measurements may be performed by the WTRU and/or a network node (e.g., eNB). During operation in coverage extended mode, a WTRU may determine a transmission scheme for UL transmissions out of a set of available transmission schemes as a function of one or a combination of the elements and parameters. For example, a WTRU may select a first transmission scheme that utilizes a single reference signal per timeslot based on the WTRU receiving a UL allocation that is for multiple TTIs. The WTRU may select a second transmission scheme using two reference signals per timeslot based on receiving a UL allocation that is for a single TTI. In an example, a WTRU may select a first transmission scheme that utilizes a single reference signal per timeslot based on the WTRU operating with no intra-subframe frequency hopping. The WTRU may select a second transmission scheme that utilizes two reference signals per timeslot based on the WTRU operating with intra-subframe frequency hopping.

As may be appreciated, the above described mode of operation whereby a WTRU determines (or is configured with) the appropriate UL transmission scheme in coverage extended mode based on the UL transmission settings and/or allocations may provide a large amount of flexibility to adapt operation to a variety of operational scenarios.

In an example, the encoding, mapping and/or generation of the pilot symbol(s) and/or the channel-coded data sequence or portions thereof used by a WTRU in a given transmission scheme may employ a randomization function to mitigate the impact of intra- and/or inter-cell interference. For example, the randomization function may operate on a per-symbol, per-timeslot, per-subframe, per-TTI basis, and/or any combination thereof. For example, different values of the randomization function may be employed by the WTRU to generate a transmission sequence associated with different selected transmission parameters for a given transmission. The randomization function used and/or the parameters associated with the randomization function may be selected based on one or more UL transmission parameters (e.g., timing of the transmission, number and/or identity of frequency resources used for the transmission, etc.) and/or the configuration/transmission scheme configured for the WTRU. For example, the randomization function may vary on a per-symbol, per-timeslot, per-subframe and/or per-TTI basis. In an example, the randomization parameters employed by the WTRU may be varied in a random and/or known order in order to generate a sequence of different selected transmission parameters for input to the randomization function.

For example, the randomization function used to generate the mapping of pilot bits and/or channel-coded data bits (e.g., pilot signals/symbols and/or channel-coded data signals/symbols) may result in the use of different cyclic shift values, different spreading codes, different input positions to the discrete Fourier transform (DFT) operation or to the inverse fast Fourier transform (IFFT) operation for a pilot and/or data signal. In an example, the use of the randomization function may result in different symbol positions within a given transmission being used to carry pilot signals for part of the transmission and data carrying signals for other parts of the transmission.

In an example, the mapping of pilot symbols and/or channel-coded data symbols onto time-frequency resources for UL transmission may be determined by the WTRU as a function randomization parameters, such as symbol number, timeslot number, subframe number, and/or TTI number. For example, the WTRU may determine the UL transmission scheme based on a table of stored randomization values. In an example, the WTRU may determine the UL transmission scheme as a function of one or more transmission parameters (e.g., symbol number, timeslot number, subframe number, and/or TTI number).

In order to further increase UL coverage, macro-diversity reception across multiple radio access network reception points may be utilized as a means to increase the effective received signal energy. Thus, the WTRU may be configured to transmit to multiple RAN reception points such that the network may determine whether the transmission was successful based on the data decoded from one of the reception points, based on the data decoded from multiple reception points (e.g., a subset of reception points), and/or based on the data decoded at each of the reception points (e.g., all of the intended reception points). To introduce macro-diversity reception while limiting added complexity to scheduling, the WTRU may be configured to utilize transmission to multiple RAN reception points for some or all transmissions associated with semi-persistent scheduling grants, but not for dynamic grants received via the PDCCH. Such a scheme that limits multiple RAN reception point transmissions to SPS may avoid the complexities inherent in the use of dynamic coordination of scheduling grants across RAN reception points.

The following techniques are described for, but not limited to, the case where a RAN reception point controller corresponds to an eNB. However, the methods and systems described may be equally applicable to reception at other RAN reception points, such as a relay node, a femto cell access point, a pico cell access point, a hone eNB (HeNB), and/or the like. For example, macro diversity reception make take place between a serving eNB and one or more neighboring non-serving eNBs. When referred to herein, a non-serving eNB may refer to an eNB that serves a cell for which the WTRU does not have a current RRC connection. Although examples for multiple RAN reception point operation may be described in terms of reception by non-serving eNBs, these examples may be equally applicable to other types of reception points, such as an eNB that serves a secondary cell used by the WTRU for carrier aggregation.

The non-serving eNBs may forward successfully decoded transmissions to the serving eNB, where macro-diversity combining of the received packets may be performed. In an example, the macro-diversity combining may take place in the RLC sub-layer of the serving eNB, where the RLC sequence number may be used for identifying duplicate packets.

The eNBs associated with the multiple reception points may communicate parameters used to facilitate reception and/or the decoded data to each other via messages on the X2 interface. For example, a new X2 procedure may be provided for configuring secondary (or non-serving) eNBs for reception of transmissions originating from neighboring cell WTRUs. A serving eNB may configure non-serving eNBs by providing the information used in order to successfully receive the WTRU transmissions. Example information that the serving eNB may provide to the non-serving neighbor eNB may include semi-persistent scheduling grant information, HARQ process timing and configuration information, WTRU specific parameters used for UL transmission, specific parameters used for UL transmission, and/or the like.

A new X2 procedure may be used for transferring decoded WTRU transmissions received at the non-serving eNBs to the serving eNB for macro-diversity combining. For example, the non-serving eNB(s) may forward to the serving eNB the WTRU transmissions that have been successfully decoded (e.g., successful CRC decoding). Transmission that are not successfully decoded may not be forwarded to the serving eNB. Further optimizations may be defined for X2 coordination in order to improve system performance. For example, a macro-diversity request procedure may be initiated, whereby a serving eNB may request that a non-serving eNB start performing macro diversity reception for a particular WTRU. Additionally, a macro-diversity termination procedure may be defined, whereby a serving eNB and/or a non-serving eNB may request the termination of the macro diversity reception for a particular WTRU. The non-serving eNBs may also use the X2 interface in order to request that the serving eNB modify one or more UL transmission parameters for the WTRU. Example parameters that a non-serving eNB may request modification for may include, but are not limited to, increase WTRU transmission power, decreasing WTRU transmission power, increasing WTRU timing advance, decreasing WTRU timing advance, and/or the like.

In order to enable macro-diversity reception by multiple reception points, repeat automatic repeat request (ARQ) may be used instead of HARQ for UL transmissions that utilize multiple RAN reception points. In another example, repeat ARQ may be used in addition to UL HARQ. In an example, repeat ARQ may be used for transmissions associated with semi-persistent scheduling grants, as these grants may allocate resources for transmissions that utilize multiple RAN reception points. In an example, when utilizing repeat ARQ the WTRU may be configured to transmit a fixed number of retransmissions for each MAC PDU sent, for example each AMC PDU sent using a semi-persistent scheduling grant. To reduce the overhead associated with such retransmissions, the WTRU may use one or more of the methods or systems described herein for protocol overhead reduction while ensuring in-order packet delivery so as to enable non-serving eNBs to receive transmitted packets.

A WTRU may modify one or more other control procedures in order to take into account the reception of UL transmissions across multiple RAN reception points. For example, a WTRU may implement a modified power control procedure that may take into account that multiple eNBs may attempt to receive the WTRU UL transmissions. For example, the open loop power control setting may be modified to take into account the path loss to non-serving eNBs. In an example, the closed loop power control feedback methods may be modified to take into account reception of power control commands from non-serving eNBs. In an example, the WTRU may be configured to begin monitoring or otherwise accepting control information provided by non-serving eNBs. For example, a WTRU utilizing multiple RAN reception points may be configured to decode one or more of the PDCCH, the PHICH, and/or new control channels associated with non-serving eNB. The non-serving eNB control channels may be used to transmit power control commands, timing advance commands, HARQ ACK/NACK, and/or control information used to facilitate multiple RAN reception point utilization.

In an example, in order to improve LTE UL coverage by making better use of the available signal energy (e.g., by utilizing an increased amount of signal energy to transmit user data rather than control data), the WTRU may be configured to reduce the overhead incurred by existing LTE communication protocols. Such techniques may increase the ratio of transmitted user data to signal energy used, and thus may lead to increased UL coverage. These methods and systems, which may be referred to as protocol overhead reduction, may be designed to minimize the overhead associated with small RLC PDUs although the techniques may be applicable to other RLC PDUs. By reducing overhead of small RLC PDUs, the gains in terms of Eb/No may be improved, for example particularly for cases when the number of RLC segments per SDU is larger than four.

In a first example to reduce overhead, the WTRU/eNB may minimize overhead by reducing the cyclic redundancy check (CRC) overhead incurred as a result of attaching a CRC to every TB. Since some TBs may include a small segment of an RLC SDU, overhead reduction may substantially increase the amount of signal energy assigned to user data portions of the RLC SDU. An example, multiple TBs may be protected using the same CRC (e.g., rather than transmitting an attached CRC with each transmitted TB), and error detection may be provided for a group of transport blocks through a single CRC. Thus, a group of transport blocks may be used to calculate the CRC parity bits. For example, if N transport blocks are grouped together, then the bits on which error detection is performed and CRC is calculated may be denoted by $(a_0, a_1, a_2, a_3, \ldots, a_{A-1})_1, (a_0, a_1, a_2, a_3, \ldots, a_{A-1})_2, \ldots, (a_0, a_1, a_2, a_3, \ldots, a_{A-1})_N$, where A may be the size of the transport block for each transport block N.

The CRC parity bits may not be attached to each transport block. In order to minimize overhead, the parity bits for the group of transport blocks may be attached to one or a subset of the transport blocks in the group. For example, the CRC may be attached to the last transport block transmitted from group, but not to the other transport blocks in the group. Alternatively, the CRC may be attached to the first transport block of the group. All other transport blocks in the transport block group may be transmitted without a CRC attached. In an example, the CRC may be attached to the first and last transport blocks.

When the CRC is attached to the first transport block, then the physical layer may wait for each of the transport blocks belonging to the group to be received prior to coding them in order to perform the CRC. In an example, the CRC may be attached to the last transport block. The WTRU may keep in memory the data bits of each transport block belonging to the group that are delivered, coded, and/or transmitted in the physical layer, and once the last transport block of the group is received, the CRC bits may be calculated based on the data bits of all the TBs in the group. The CRC may then be attached to this last transport block.

In an example, the WTRU may calculate the CRC per transport block, but may not attach the calculated CRC to every transport block. For example, when the last transport block of the group is to be transmitted the attached CRC may correspond to the sum or some other function of each of the CRCs of transport blocks belonging to the group. On the receiver side each the transport block belonging to a group may be decoded and the receiver may use the CRC received in the last/or first transport block to perform error detection for the full block. If the CRC for the multiple TBs passes, then each of the transport blocks in the group may be delivered to the MAC and RLC.

A group of transport blocks that share and/or utilize a common CRC (or CRC function) may be determined or defined based one or a combination of the following criteria. For example, the eNB may configure the WTRU with one or more TB group sizes, for example via higher layer (e.g., MAC, RLC, RRC) signaling. The WTRU may then determine a group of transport blocks based on the number of transport blocks in each group as provided by the eNB In an example, the WTRU may determine utilize a common CRC for a group of transport blocks based on transport blocks in the group carrying RLC PDUs or segments of RLC PDUs that are segments of the same RLC SDU (e.g. transport blocks carrying segments of the same RLC SDU). In an example, WTRU may determine utilize a common CRC for a group of transport blocks based on the number times an RLC SDU is segmented being above a threshold. The threshold for the number of segmentations triggering TB grouping may be set based on the WTRU power headroom and/or may be configured by the via higher layers (e.g., MAC, RLC, RRC) signaling.

In an example, the WTRU may determine utilize a common CRC for a group of transport blocks based on HARQ process number. For example, transport blocks that are associated with certain HARQ process numbers and/or associated with HARQ processes configured for TB group transmission may be grouped together. The identity of HARQ processes associated with CRCs across multiple TBs may be predetermined or configured via higher layers (e.g., MAC, RLC, RRC) signaling. In order to indicate the first and/or last block of a TB group, the TTI and/or HARQ process number on which a certain (e.g., first, last, TB with CRC, etc.) TB that is part of a TB group may be predefined or configured. For example, if the TB number is N, then transmissions associated with HARQ process (0-N) may belong to the same group as TB number N. In an example, the HARQ process numbers for TBs that belong to the same group may be transmitted by and/or explicitly configured by the network.

In the CRC may be performed on the RLC SDU and attached to the RLC SDU. The RLC SDU+CRC may then be segmented across multiple RLC PDUs and transmitted over multiple transport blocks. The physical layer on the receiver side may deliver the transport blocks after decoding and soft combining. If such a technique is utilized rather than attaching the CRCs to individually transmitted TBs, since a CRC would not be present for each transport block the receiver be unaware of whether or not the transport block has been successfully decoded. Therefore, to facilitate combining at the receiver side, each transport block that is part of the group may be blindly retransmitted if the WTRU does not receive feedback. The receiving side may attempt to recombine the received data in the RLC layer. Once a RLC SDU is reassembled the WTRU may perform error detection on the RLC SDU to determine whether the data from the physical layer was successfully decoded.

In an example, the CRC may be performed on the RLC SDU, however the CRC parity bits calculated from the RLC SDU may be attached and provided in one or a subset of the transport blocks used for transmission of the RLC SDU. For example, the CRC may be attached to the last transport block containing bits from the RLC SDU on which the CRC was performed. The other transport blocks may be delivered without attaching a CRC.

In an example, overheard may be reduced over the UM RLC protocol by modifying the RLC control overhead to remove the RLC Sequence Number. For example, overhead may be further reduced by modifying the RLC protocol to remove some header information such as RLC sequence numbers. This may be achieved by relying on in-order delivery by the HARQ entity as described herein. The RLC SN number may not be present and the WTRU may rely on the segmentation information in the RLC header to reassemble the RLC PDUs.

If a packet is lost in the HARQ process, the HARQ process may indicate this to the RLC and the RLC may take this into account when determining how to reassemble packets. For example, a first packet may be received prior to a packet that is indicated as being lost by the HARQ entity associated with the appropriate HARQ process. A second packet may be received after the first packet and after the indication that there is a lost packet. If the first packet corresponds to a first or middle segment of an RLC PDU and the second packet corresponds to another middle segment of the RLC PDU, a final segment of the RLC PDU, or a subsequent RLC PDU (or segment thereof), then the WTRU/eNB may determine that the lost data is a segment belonging to the same RLC SDU as is associated with the first packet. Therefore, the WTRU may determine to discard data associated with this RLC PDU since at least one segment thereof may be lost (e.g., the WTRU may discard data for RLC SDUs for which it has determined a segment is missing). The WTRU may then request retransmission of the entire RLC PDU (e.g., using a RLC Status Report).

In an example, a CRC may be added and attached to the RLC SDU, for example to ensure that even if some data is lost or corrupted in the physical layer the WTRU still has some means to determine that it is combining the correct RLC PDUs (e.g., if the CRC fails). The RLC SN may be eliminated for logical channels configured with this functionality by RRC layer signaling and/or when UL coverage enhancements functionalities are enabled in the WTRU.

Techniques and methods are described herein to ensure in-order packet delivery transmission and reception in the physical layer. In order to ensure in packet delivery the transmitter side may ensure that data is delivered first-in, first-out order. More specifically, this may be performed by placing data from the RLC in the physical layer transmission buffer in-order and ensuring that they are transmitted in the same order.

In an example, the transmitting device may determine to refrain from emptying the HARQ buffer and/or may determine to refrain from initiating a new HARQ transmission at a given TTI if one and/or a combination of the following conditions are satisfied. For example, the transmitting device may determine to refrain from emptying the HARQ buffer and/or may determine to refrain from initiating a new HARQ transmission based on determining that older data has not yet finished being transmission. The WTRU may determine the older data has not yet finished processing based on determining that a previously used HARQ process has not yet completed the transmission of the earlier data (e.g., reception of the previous data for the previously used HARQ process has not yet been acknowledged or has been negatively acknowledged). The physical layer may determine if any earlier transmissions are ongoing by tracking the time at which a first transmission in a HARQ process was initiated. If a transmission on an ongoing HARQ process was initiated earlier than the given HARQ process, then the WTRU may determine to refrain from starting a new transmission and/or refrain from emptying its HARQ buffer. The physical layer may determine if any earlier transmissions are ongoing by monitoring the RLC PDUs that are present in the HARQ process transmissions. If the RLC PDUs of an ongoing HARQ process belong to RLC PDUs that were transmitted prior to the RLC PDU associated with a HARQ process for a subsequent transmission, then the WTRU may determine to refrain from initiating a new transmission or flushing its HARQ buffer.

The transmitting device may determine to refrain from emptying the HARQ buffer and/or may determine to refrain from initiating a new HARQ transmission based on the data contained in the new transport block being associated with a logical channel for which UL coverage enhancements have been configured. For example, if data to be transmitted in a given TTI corresponds to a logical channel for which UL coverage enhancements and/or protocol overhead reduction is not configured, the WTRU may determine to transmit the data in the TTI without taking into account or ensuring in-order delivery. Otherwise, the WTRU may determine whether or not previously transmitted data has been successfully delivered prior to determining to transmit the data in the given TTI if the data corresponds to a logical channel for which UL coverage enhancements and/or protocol overhead reduction has been configured.

The transmitting device may determine to refrain from emptying the HARQ buffer and/or may determine to refrain from initiating a new HARQ transmission based on the data include in the new transport block to be transmitted containing one or more segments of RLC SDUs. In an example, if data within a TB to be transmitted corresponds to full RLC SDU, then the WTRU may determine to transmit and deliver the TB in the given TTI. If the data includes one or more RLC SDU segments, then the WTRU may first determine whether previously transmitted data for the segmented RLC SDU and/or the RLC SDUs transmitted prior to the segmented RLC SDU have been successfully received prior to transmitting the RLC SDU segment in a given TTI. In an example, the transmitting device may determine to refrain from emptying the HARQ buffer and/or may determine to refrain from initiating a new HARQ transmission based on the maximum HARQ retransmissions having not yet been performed for data initiated prior to the given HARQ process.

The receiver side may attempt to ensure in-order delivery to the RLC by waiting until the maximum number of HARQ retransmissions have been performed for HARQ process(es) associated with initial transmissions that occurred before the initial transmission of a given HARQ process before attempting to process the given HARQ process. In this way, the receiver may process HARQ transmissions in the order in which the initial transmissions for the HARQ processes were received. In an example, the receiver side may wait until all HARQ process(es) associated with initial transmissions that occurred before the initial transmission of a given HARQ process have been successfully received before sending data for the given HARQ process to higher layers (e.g., RLC) for processing. For example, if for a given HARQ process the data is successfully received, the WTRU may not deliver this data to higher layers until HARQ processes associated with initial transmissions that occurred prior to the initial transmission of the given HARQ process have also been successfully received and/or served to higher layers.

In an example, the WTRU and/or eNB may utilize the grant type field included in transmissions to differentiate between new HARQ transmissions and HARQ retransmissions. For example, the WTRU may use a semi-persistent grant allocation for sending the initial HARQ transmission. Subsequently, HARQ retransmissions may be performed on using a PDCCH UL allocation (e.g., adaptive HARQ retransmissions). The adaptive HARQ retransmissions may be performed on a different set of resources than those configured through the semi-persistent allocation in order to avoid confusion between first HARQ transmission and HARQ retransmissions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method implemented by a wireless transmit receive unit (WTRU) for performing transmission time interval (TTI) bundling, the method comprising:
    receiving a radio resource control (RRC) message, the RRC message indicating that the WTRU is to perform TTI bundling, wherein the RRC message indicates which of a plurality of hybrid automatic repeat request (HARQ) configurations are to be used when performing TTI bundling, wherein a first HARQ configuration is associated with a shorter time period between the WTRU receiving HARQ feedback for a bundled transmission and the WTRU performing a HARQ retransmission for the bundled transmission than a second HARQ configuration;
    performing a first bundled transmission, wherein the first bundled transmission is associated with a bundle size of four subframes;
    receiving first hybrid automatic repeat request (HARQ) feedback for the first bundled transmission, wherein the first HARQ feedback comprises a negative acknowledgement (NACK), wherein HARQ feedback for a bundled transmission is received four subframes after completion of the bundled transmission for each of the first and second HARQ configurations; and
    transmitting a first bundled retransmission, wherein the first bundled retransmission is associated with a bundle size of four subframes and is transmitted a determined number of subframes after receiving the first HARQ feedback, wherein the determined number of subframes is shorter for the first HARQ configuration than for the second HARQ configuration.

2. The method as in claim 1, wherein the first HARQ configuration corresponds to a coverage limited mode of operation.

3. The method as in claim 1, wherein a number of active HARQ processes is dependent on whether the WTRU is operating according to the first HARQ configuration or the second HARQ configuration.

4. The method as in claim 3, wherein the first HARQ configuration is associated with fewer active HARQ processes than the second HARQ configuration.

5. The method as in claim 1, further comprising receiving a TTI bundling reconfiguration, wherein the TTI bundling reconfiguration changes the HARQ configuration to be used for performing subsequent bundled transmissions.

6. A wireless transmit receive unit (WTRU) comprising a processor configured, at least in part, to:
    receive a radio resource control (RRC) message, the RRC message indicating that the WTRU is to perform transmission time interval (TTI) bundling, wherein the RRC message indicates which of a plurality of hybrid automatic repeat request (HARQ) configurations are to be used when performing TTI bundling, wherein a first HARQ configuration is associated with a shorter time period between the WTRU receiving HARQ feedback for a bundled transmission and the WTRU performing a HARQ retransmission for the bundled transmission than a second HARQ configuration;
    perform a first bundled transmission, wherein the first bundled transmission is associated with a bundle size of four subframes;
    receive first hybrid automatic repeat request (HARQ) feedback for the first bundled transmission, wherein the first HARQ feedback comprises a negative acknowledgement (NACK), wherein HARQ feedback for a bundled transmission is received four subframes after completion of the bundled transmission for each of the first and second HARQ configurations; and
    transmit a first bundled retransmission, wherein the first bundled retransmission is associated with a bundle size of four subframes and is transmitted a determined number of subframes after receiving the first HARQ feedback, wherein the determined number of subframes is shorter for the first HARQ configuration than for the second HARQ configuration.

7. The WTRU as in claim 6, wherein the first HARQ configuration corresponds to a coverage limited mode of operation.

8. The WTRU as in claim 6, wherein a number of active HARQ processes is dependent on whether the WTRU is operating according to the first HARQ configuration or the second HARQ configuration.

9. The WTRU as in claim 8, wherein the first HARQ configuration is associated with fewer active HARQ processes than the second HARQ configuration.

10. The WTRU as in claim 6, wherein the processor is further configured to receive a TTI bundling reconfiguration, wherein the TTI bundling reconfiguration changes the HARQ configuration to be used for performing subsequent bundled transmissions.

11. An evolved Node B (eNB) comprising a processor configured, at least in part, to:
- transmit a radio resource control (RRC) message to a wireless transmit receive unit (WTRU), the RRC message indicating that the WTRU is to perform transmission time interval (TTI) bundling, wherein the RRC message indicates which of a plurality of hybrid automatic repeat request (HARQ) configurations are to be used when performing TTI bundling, wherein a first HARQ configuration is associated with a shorter time period between the WTRU receiving HARQ feedback for a bundled transmission and the WTRU performing a HARQ retransmission for the bundled transmission than a second HARQ configuration;
- receive a first bundled transmission, wherein the first bundled transmission is associated with a bundle size of four subframes;
- transmit first hybrid automatic repeat request (HARQ) feedback for the first bundled transmission, wherein the first HARQ feedback comprises a negative acknowledgement (NACK), and HARQ feedback for a bundled transmission is transmitted four subframes after completion of the bundled transmission for each of the first and second HARQ configurations; and
- receive a first bundled retransmission, wherein the first bundled retransmission is associated with a bundle size of four subframes and is transmitted a determined number of subframes after receiving the first HARQ feedback, wherein the determined number of subframes is shorter for the first HARQ configuration than for the second HARQ configuration.

12. The eNB as in claim 11, wherein the first HARQ configuration corresponds to a coverage limited mode of operation.

13. The eNB as in claim 11, wherein a number of active HARQ processes is dependent on whether the WTRU is operating according to the first HARQ configuration or the second HARQ configuration.

* * * * *